United States Patent
Zhao et al.

(10) Patent No.: US 12,379,574 B2
(45) Date of Patent: Aug. 5, 2025

(54) OPTICAL IMAGING LENS ASSEMBLY

(71) Applicant: Zhejiang Sunny Optics Co., Ltd, Zhejiang (CN)

(72) Inventors: Yikun Zhao, Zhejiang (CN); Yu Zhou, Zhejiang (CN); Yunbing Ji, Zhejiang (CN); Fujian Dai, Zhejiang (CN); Liefeng Zhao, Zhejiang (CN)

(73) Assignee: Zhejiang Sunny Optics Co., Ltd., Zhejiang (CN)

( * ) Notice: Subject to any disclaimer, the term of this patent is extended or adjusted under 35 U.S.C. 154(b) by 699 days.

(21) Appl. No.: 17/698,052

(22) Filed: Mar. 18, 2022

(65) Prior Publication Data
US 2022/0350111 A1    Nov. 3, 2022

(30) Foreign Application Priority Data
Apr. 25, 2021  (CN) .......................... 202110448373.5

(51) Int. Cl.
*G02B 9/62*    (2006.01)
*G02B 13/00*   (2006.01)

(52) U.S. Cl.
CPC ........... *G02B 9/62* (2013.01); *G02B 13/0045* (2013.01)

(58) Field of Classification Search
CPC ......... G02B 9/62; G02B 9/64; G02B 13/0045
USPC ........ 359/713, 752, 756, 757, 759, 761, 762
See application file for complete search history.

(56) References Cited

U.S. PATENT DOCUMENTS

| | | | | |
|---|---|---|---|---|
| 2015/0370038 A1* | 12/2015 | Sun | .......................... | G02B 9/62 359/757 |
| 2019/0278063 A1* | 9/2019 | Sekine | ............... | G02B 13/0045 |
| 2020/0073085 A1* | 3/2020 | Huang | ..................... | G02B 9/64 |

FOREIGN PATENT DOCUMENTS

| | | |
|---|---|---|
| CN | 204679707 U | 9/2015 |
| CN | 106802469 A | 6/2017 |
| CN | 106896475 A | 6/2017 |
| CN | 111399193 A | 7/2020 |
| JP | 5841290 B1 | 1/2016 |
| WO | WO-2020029620 A1 * | 2/2020 ......... G02B 13/0015 |

* cited by examiner

*Primary Examiner* — Ricky L Mack
*Assistant Examiner* — Natasha Nigam
(74) *Attorney, Agent, or Firm* — Sughrue Mion, PLLC

(57) ABSTRACT

The present disclosure provides an optical imaging lens assembly. The optical imaging lens assembly includes, sequentially along an optical axis from an object side to an image side: a stop; a first lens, having a refractive power; a second lens, having a refractive power, an object-side surface of the second lens being a concave surface; a third lens, having a positive refractive power; a fourth lens, having a negative refractive power, an object-side surface of the fourth lens being a convex surface; a fifth lens, having a refractive power; and a sixth lens, having a refractive power. A distance TTL from an object-side surface of the first lens to an image plane of the optical imaging lens assembly along the optical axis and half of a diagonal length ImgH of an effective pixel area on the image plane of the optical imaging lens assembly satisfy: TTL/ImgH<1.5.

17 Claims, 9 Drawing Sheets

OPTICAL IMAGING LENS ASSEMBLY

CROSS-REFERENCE TO RELATED APPLICATIONS

This application claims benefit of priority to Chinese Patent Application No. 202110448373.5 filed on Apr. 25, 2021 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

With the development of society, electronic products such as mobile phones and tablets have become indispensable tools in our lives. In order to be compatible with these electronic products, the lens assemblies of the mobile phones are gradually developing in the direction of miniaturization, lightweight and thinness while the imaging quality is ensured, which makes the design more difficult. In addition, the performance improvement and size reduction of image sensors also make the design freedom of the corresponding lens assemblies less and less, which increases the design difficulty.

SUMMARY

In an aspect of the present disclosure, an optical imaging lens assembly is provided, and the optical imaging lens assembly includes, sequentially along an optical axis from an object side to an image side: a stop; a first lens having a refractive power; a second lens having a refractive power, an object-side surface of the second lens being a concave surface; a third lens having a positive refractive power; a fourth lens having a negative refractive power, an object-side surface of the fourth lens being a convex surface; a fifth lens having a refractive power; and a sixth lens having a refractive power. A distance TTL from an object-side surface of the first lens to an image plane of the optical imaging lens assembly along the optical axis, and half of a diagonal length ImgH of an effective pixel area on the image plane of the optical imaging lens assembly may satisfy: TTL/ImgH<1.5. An effective focal length f4 of the fourth lens and an effective focal length f1 of the first lens may satisfy: $-9.0<f4/f1<-3.5$.

In an implementation, a maximum field-of-view FOV of the optical imaging lens assembly may satisfy: FOV≥−75°.

In an implementation, an effective focal length f of the optical imaging lens assembly and an entrance pupil diameter EPD of the optical imaging lens assembly may satisfy: f/EPD<2.0.

In an implementation, the effective focal length f4 of the fourth lens and the effective focal length f of the optical imaging lens assembly may satisfy: $-7.5<f4/f<-3.0$.

In an implementation, an effective focal length f2 of the second lens and the effective focal length f1 of the first lens may satisfy: $-3.5<f2/f1<-2.0$.

In an implementation, an effective focal length f2 of the second lens and an effective focal length f6 of the sixth lens may satisfy: $2.0<f2/f6<4.0$.

In an implementation, an edge thickness ET6 of the sixth lens and an edge thickness ET4 of the fourth lens may satisfy: $6.5<1/ET6/ET4<25$.

In an implementation, a center thickness CT4 of the fourth lens on the optical axis and an axial distance SAG41 from an intersection point of the object-side surface of the fourth lens and the optical axis to a vertex of an effective radius of the object-side surface of the fourth lens may satisfy: $-2.0<CT4/SAG41<-1.0$.

In an implementation, an axial distance SAG61 from an intersection point of an object-side surface of the sixth lens and the optical axis to a vertex of an effective radius of the object-side surface of the sixth lens and a center thickness CT6 of the sixth lens on the optical axis may satisfy: $-2.5<SAG61/CT6<-1.0$.

In an implementation, a maximum effective radius DT52 of an image-side surface of the fifth lens and a maximum effective radius DT51 of an object-side surface of the fifth lens may satisfy: $0.5<DT52/DT51<1.5$.

In an implementation, an axial distance SAG61 from an intersection point of an object-side surface of the sixth lens and the optical axis to a vertex of an effective radius of the object-side surface of the sixth lens and an axial distance SAG51 from an intersection point of an object-side surface of the fifth lens and the optical axis to a vertex of an effective radius of the object-side surface of the fifth lens may satisfy: $1.0<SAG61/SAG51<3.5$.

In an implementation, a radius of curvature R7 of the object-side surface of the fourth lens and a radius of curvature R8 of an image-side surface of the fourth lens may satisfy: $1.0<R7/R8<3.5$.

In an implementation, a radius of curvature R11 of an object-side surface of the sixth lens, a radius of curvature R12 of an image-side surface of the sixth lens and an effective focal length f6 of the sixth lens may satisfy: $1.0<(R11+R12)/f6<1.5$.

In an implementation, a center thickness CT3 of the third lens on the optical axis and an edge thickness ET3 of the third lens may satisfy: $1.0<CT3/ET3<2.0$.

In another aspect of the present disclosure, an optical imaging lens assembly is provided, and the optical imaging lens assembly includes, sequentially along an optical axis from an object side to an image side: a stop; a first lens having a refractive power; a second lens having a refractive power, an object-side surface of the second lens being a concave surface; a third lens having a positive refractive power; a fourth lens having a negative refractive power, an object-side surface of the fourth lens being a convex surface; a fifth lens having a refractive power; and a sixth lens having a refractive power. A maximum field-of-view FOV of the optical imaging lens assembly may satisfy: FOV≥−75°. An effective focal length f4 of the fourth lens and an effective focal length f1 of the first lens may satisfy: $-9.0<f4/f1<-3.5$.

In an implementation, the effective focal length f4 of the fourth lens and the effective focal length f of the optical imaging lens assembly may satisfy: $-7.5<f4/f<-3.0$.

In an implementation, a distance TTL from an object-side surface of the first lens to an image plane of the optical imaging lens assembly along the optical axis, and half of a diagonal length ImgH of an effective pixel area on the image plane of the optical imaging lens assembly may satisfy: TTL/ImgH<1.5.

In an implementation, an effective focal length f of the optical imaging lens assembly and an entrance pupil diameter EPD of the optical imaging lens assembly may satisfy: f/EPD<2.0.

In an implementation, an effective focal length f2 of the second lens and the effective focal length f1 of the first lens may satisfy: $-3.5<f2/f1<-2.0$.

In an implementation, an effective focal length f2 of the second lens and an effective focal length f6 of the sixth lens may satisfy: $2.0<f2/f6<4.0$.

In an implementation, an edge thickness ET6 of the sixth lens and an edge thickness ET4 of the fourth lens may satisfy: $6.5<1/ET6/ET4<25$.

In an implementation, a center thickness CT4 of the fourth lens on the optical axis and an axial distance SAG41 from an intersection point of the object-side surface of the fourth lens and the optical axis to a vertex of an effective radius of the object-side surface of the fourth lens may satisfy: $-2.0<CT4/SAG41<-1.0$.

In an implementation, an axial distance SAG61 from an intersection point of an object-side surface of the sixth lens and the optical axis to a vertex of an effective radius of the object-side surface of the sixth lens and a center thickness CT6 of the sixth lens on the optical axis may satisfy: $-2.5<SAG61/CT6<-1.0$.

In an implementation, a maximum effective radius DT52 of an image-side surface of the fifth lens and a maximum effective radius DT51 of an object-side surface of the fifth lens may satisfy: $0.5<DT52/DT51<1.5$.

In an implementation, an axial distance SAG61 from an intersection point of an object-side surface of the sixth lens and the optical axis to a vertex of an effective radius of the object-side surface of the sixth lens and an axial distance SAG51 from an intersection point of an object-side surface of the fifth lens and the optical axis to a vertex of an effective radius of the object-side surface of the fifth lens may satisfy: $1.0<SAG61/SAG51<3.5$.

In an implementation, a radius of curvature R7 of the object-side surface of the fourth lens and a radius of curvature R8 of an image-side surface of the fourth lens may satisfy: $1.0<R7/R8<3.5$.

In an implementation, a radius of curvature R11 of an object-side surface of the sixth lens, a radius of curvature R12 of an image-side surface of the sixth lens and an effective focal length f6 of the sixth lens may satisfy: $1.0<(R11+R12)/f6<1.5$.

In an implementation, a center thickness CT3 of the third lens on the optical axis and an edge thickness ET3 of the third lens may satisfy: $1.0<CT3/ET3<2.0$.

The present disclosure adopts a six-piece lens structure. Through a reasonable distribution of refractive powers of the lenses and an optimal selection for surface types and thicknesses of the lenses, the optical imaging lens assembly can have at least one beneficial effect such as miniaturization, lightweight and thinness, and a good imaging quality.

BRIEF DESCRIPTION OF THE DRAWINGS

In combination with the accompanying drawings, other features, objectives and advantages of the present disclosure will become more apparent through the following detailed description of non-limiting embodiments. In the accompanying drawings.

DETAILED DESCRIPTION OF EMBODIMENTS

Figure 1:
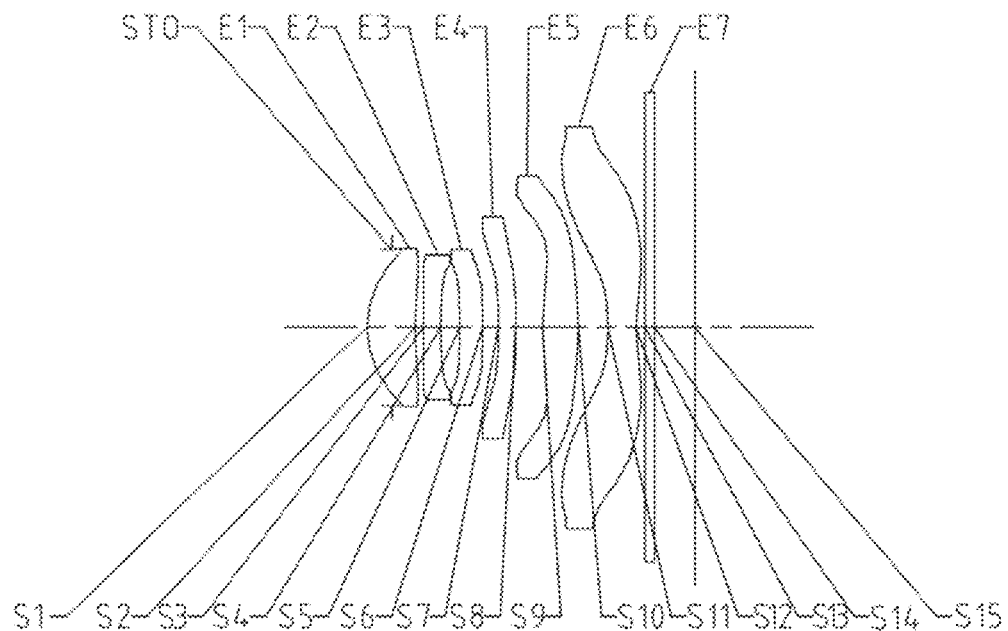
FIG. 1 is a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as first, second and third are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least in the paraxial area. If the lens surface is a concave surface and the position of the concave surface is not defined, it represents that the lens surface is a concave surface at least in the paraxial area. Herein, in each lens, a surface closest to a photographed object is referred to as the object-side surface of the lens, and a surface closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging lens assembly according to exemplary implementations of the present disclosure may include, for example, six lenses having refractive powers (i.e., a first lens, a second lens, a third lens, a fourth lens, a fifth lens and a sixth lens). The six lenses are arranged in sequence along an optical axis from an object side to an image side.

In the exemplary implementations, the first lens may have a positive refractive power or a negative refractive power, the second lens may have a positive refractive power or a negative refractive power, the third lens may have a positive refractive power, the fourth lens may have a negative refractive power, the fifth lens may have a positive refractive power or a negative refractive power, and the sixth lens may have a positive refractive power or a negative refractive power.

In the exemplary implementations, an object-side surface of the second lens may be a concave surface. An object-side surface of the fourth lens may be a convex surface.

In the exemplary implementations, the optical imaging lens assembly of the present disclosure may satisfy a conditional expression: TTL/ImgH<1.5. Here, TTL is a distance from an object-side surface of the first lens to an image plane of the optical imaging lens assembly along the optical axis, and ImgH is half of a diagonal length of an effective pixel area on the image plane of the optical imaging lens assembly. By controlling the ratio of the distance from the object-side surface of the first lens to the image plane of the optical imaging lens assembly along the optical axis to the half of the diagonal length of the effective pixel area on the image plane of the optical imaging lens assembly within this range, it can be ensured that the optical imaging lens assembly has a lightweight characteristic. More specifically, TTL and ImgH may satisfy: TTL/ImgH<1.4.

In the exemplary implementations, the optical imaging lens assembly of the present disclosure may satisfy a conditional expression: $-9.0<f4/f1<-3.5$. Here, f4 is an effective focal length of the fourth lens, and f1 is an effective focal length of the first lens. By controlling the ratio of the effective focal length of the fourth lens to the effective focal length of the first lens within this range, the refractive powers can be reasonably distributed, which is conducive to improving the imaging quality of the lens assembly. More specifically, f4 and f1 may satisfy: $-8.6<f4/f1<-3.7$.

In the exemplary implementations, the optical imaging lens assembly of the present disclosure may satisfy a conditional expression: FOV≥-75°. Here, FOV is a maximum field-of-view of the optical imaging lens assembly. By controlling the maximum field-of-view of the optical imaging lens assembly to satisfy FOV≥75°, the optical imaging lens assembly can still have a good imaging range even in a small size. More specifically, FOV may satisfy: FOV≥79°.

In the exemplary implementations, the optical imaging lens assembly of the present disclosure may satisfy a conditional expression: f/EPD<2.0. Here, f is an effective focal length of the optical imaging lens assembly, and EPD is an entrance pupil diameter of the optical imaging lens assembly. By controlling the ratio of the effective focal length of the optical imaging lens assembly to the entrance pupil diameter of the optical imaging lens assembly within this range, the F-number of the optical system can be small, and thus it can be ensured that the optical imaging lens assembly has a large aperture, such that the lens assembly can have a good imaging quality even in a dark environment.

In the exemplary implementations, the optical imaging lens assembly of the present disclosure may satisfy a conditional expression: 6.5<1/ET6/ET4<25. Here, ET6 is an edge thickness of the sixth lens, and ET4 is an edge thickness of the fourth lens. By controlling the edge thickness of the sixth lens and the edge thickness of the fourth lens to satisfy 6.5<1/ET6/ET4<25, it can be ensured that the optical imaging lens assembly has a good processability, and at the same time, a good imaging quality can be ensured. More specifically, ET6 and ET4 may satisfy: 11<1/ET6/ET4<25.

In the exemplary implementations, the optical imaging lens assembly of the present disclosure may satisfy a conditional expression: $-7.5<f4/f<-3.0$. Here, f4 is the effective focal length of the fourth lens, and f is the effective focal length of the optical imaging lens assembly. By controlling the ratio of the effective focal length of the fourth lens to the effective focal length of the optical imaging lens assembly within this range, the refractive powers can be reasonably distributed, which helps to improve the aberration of the optical system. More specifically, f4 and f may satisfy: $-6.8<f4/f<-3.1$.

In the exemplary implementations, the optical imaging lens assembly of the present disclosure may satisfy a conditional expression: $-3.5<f2/f1<-2.0$. Here, f2 is an effective focal length of the second lens, and f1 is the effective focal length of the first lens. By controlling the ratio of the effective focal length of the second lens to the effective focal length of the first lens within this range, the optical sensitivity of the first lens and the second lens can be effectively reduced, which is more conducive to mass production. More specifically, f2 and f1 may satisfy: $-3.2<f2/f1<-2.0$.

In the exemplary implementations, the optical imaging lens assembly of the present disclosure may satisfy a conditional expression: $2.0<f2/f6<4.0$. Here, f2 is the effective focal length of the second lens, and f6 is the effective focal length of the sixth lens. The ratio of the effective focal length of the second lens to the effective focal length of the sixth lens is controlled within this range, which helps the optical imaging lens assembly better balance the aberration. At the same time, the controlling is conducive to improving the resolution of the optical system. More specifically, f2 and f6 may satisfy: $2.1<f2/f6<3.7$.

In the exemplary implementations, the optical imaging lens assembly of the present disclosure may satisfy a conditional expression: $-2.0<CT4/SAG41<-1.0$. Here, CT4 is a center thickness of the fourth lens on the optical axis, and SAG41 is an axial distance from an intersection point of the object-side surface of the fourth lens and the optical axis to a vertex of an effective radius of the object-side surface of the fourth lens. By controlling the ratio of the center thickness of the fourth lens on the optical axis to the axial distance from the intersection point of the object-side surface of the fourth lens and the optical axis to the vertex of the effective radius of the object-side surface of the fourth lens within this range, the chief ray angle of the optical system can be effectively adjusted. At the same time, the controlling makes the optical imaging lens assembly have a better capability to balance the chromatic aberration and the distortion, and thus the imaging quality of the optical system is improved. More specifically, CT4 and SAG41 may satisfy: $-1.8<CT4/SAG41<-1.0$.

In the exemplary implementations, the optical imaging lens assembly of the present disclosure may satisfy a conditional expression: $-2.5<SAG61/CT6<-1.0$. Here, SAG61 is an axial distance from an intersection point of an object-side surface of the sixth lens and the optical axis to a vertex of an effective radius of the object-side surface of the sixth lens, and CT6 is a center thickness of the sixth lens on the optical axis. The ratio of the axial distance from the intersection point of the object-side surface of the sixth lens and the optical axis to the vertex of the effective radius of the object-side surface of the sixth lens to the center thickness of the sixth lens on the optical axis is controlled within this range, which can prevent the sixth lens from being too curved, thus reducing the processing difficulty. More specifically, SAG61 and CT6 may satisfy: $-1.8<SAG61/CT6<-1.3$.

In the exemplary implementations, the optical imaging lens assembly of the present disclosure may satisfy a conditional expression: $0.5<DT52/DT51<1.5$. Here, DT52 is a maximum effective radius of an image-side surface of the fifth lens, and DT51 is a maximum effective radius of an object-side surface of the fifth lens. By controlling the ratio of the maximum effective radius of the image-side surface of the fifth lens to the maximum effective radius of the object-side surface of the fifth lens within this range, the difficulty of processing and assembling the optical imaging lens assembly can be reduced, and thus it is ensured that the aberration of optical system is small, thereby obtaining a higher image quality. More specifically, DT52 and DT51 may satisfy: $0.9<DT52/DT51<1.3$.

In the exemplary implementations, the optical imaging lens assembly of the present disclosure may satisfy a conditional expression: $1.0<SAG61/SAG51<3.5$. Here, SAG61 is the axial distance from the intersection point of the object-side surface of the sixth lens and the optical axis to the vertex of the effective radius of the object-side surface of the sixth lens, and SAG51 is an axial distance from an intersection point of the object-side surface of the fifth lens and the optical axis to a vertex of an effective radius of the object-side surface of the fifth lens. By controlling the ratio of the axial distance from the intersection point of the object-side surface of the sixth lens and the optical axis to the vertex of the effective radius of the object-side surface of the sixth lens to the axial distance from the intersection point of the object-side surface of the fifth lens and the optical axis to the vertex of the effective radius of the object-side surface of the fifth lens within this range, the incident angles of the chief ray on the object-side surfaces of the fifth lens and the sixth lens can be effectively reduced, thus improving the degree of matching between the optical imaging lens assembly and the chip. More specifically, SAG61 and SAG51 may satisfy: $1.1<SAG61/SAG51<2.8$.

In the exemplary implementations, the optical imaging lens assembly of the present disclosure may satisfy a conditional expression: $1.0<R7/R8<3.5$. Here, R7 is a radius of curvature of the object-side surface of the fourth lens, and R8 is a radius of curvature of an image-side surface of the fourth lens. The ratio of the radius of curvature of the object-side surface of the fourth lens to the radius of curvature of the image-side surface of the fourth lens is controlled within this range, which can be conducive to ensuring that the fourth lens has an appropriate negative refractive power. More specifically, R7 and R8 may satisfy: $1.4<R7/R8<3.1$.

In the exemplary implementations, the optical imaging lens assembly of the present disclosure may satisfy a conditional expression: $1.0<(R11+R12)/f6<1.5$. Here, R11 is a radius of curvature of the object-side surface of the sixth lens, R12 is a radius of curvature of an image-side surface of the sixth lens, and f6 is the effective focal length of the sixth lens. The ratio of the sum of the radius of curvature of the object-side surface of the sixth lens and the radius of curvature of the image-side surface of the sixth lens to the effective focal length of the sixth lens is controlled within this range, which can be conducive to controlling the incident angle of the ray of the off-axis field on the image plane, which helps the optical imaging lens assembly better match the CRA (chief ray angle) of the chip.

In the exemplary implementations, the optical imaging lens assembly of the present disclosure may satisfy a conditional expression: $1.0<CT3/ET3<2.0$. Here, CT3 is a center thickness of the third lens on the optical axis and ET3 is an edge thickness of the third lens. By controlling the ratio of the center thickness of the third lens on the optical axis to the edge thickness of the third lens within this range, it can be ensured that the third lens has a good processing characteristic. More specifically, CT3 and ET3 may satisfy: $1.0<CT3/ET3<1.3$.

In the exemplary implementations, the above optical imaging lens assembly may further include at least one stop. The stop may be disposed at an appropriate position as required. For example, the stop is disposed between the object and the first lens. Alternatively, the above optical imaging lens assembly may further include an optical filter for correcting color deviations and/or a protective glass for protecting a photosensitive element on the image plane.

The optical imaging lens assembly according to the above implementations of the present disclosure may use a plurality of lenses, for example, the above six lenses. By reasonably distributing the refractive powers and the surface types of the lenses, the center thicknesses of the lenses, the axial spacings between the lenses, etc., the lens assembly can have characteristics such as miniaturization, lightweight and thinness, and can have a good imaging quality.

In the implementations of the present disclosure, at least one of the surfaces of the lenses is an aspheric surface. That is, at least one of the surfaces from the object-side surface of the first lens to the image-side surface of the sixth lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens and the sixth lens is an aspheric surface. Alternatively, the object-side surface and the image-side surface of each of the first lens, the second lens, the third lens, the fourth lens, the fifth lens and the sixth lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having six lenses is described as an example in the implementations, the optical imaging lens assembly is not limited to including the six lenses. If desired, the optical imaging lens assembly may alternatively include other numbers of lenses.

Specific embodiments of the optical imaging lens assembly that may be applicable to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram of the optical imaging lens assembly according to Embodiment 1 of the present disclosure.

As shown in FIG. 1, the optical imaging lens assembly includes, sequentially along an optical axis from an object side to an image side, a stop STO, a first lens E1, a second lens E2, a third lens E3, a fourth lens E4, a fifth lens E5 and a sixth lens E6 and an optical filter E7.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The optical filter E7 has an object-side surface S13 and an image-side surface S14. The optical imaging lens assembly has an image plane S15, and light from an object sequentially passes through the surfaces S1-S14 and finally forms an image on the image plane S15.

Table 1 shows basic parameters of the optical imaging lens assembly in Embodiment 1. Here, the units of a radius of curvature and a thickness/distance are millimeters (mm).

TABLE 1

| surface number | surface type | radius of curvature | thickness/ distance | material refractive index | abbe number | conic coefficient |
|---|---|---|---|---|---|---|
| OBJ | spherical | infinite | 400.0000 | | | |
| STO | spherical | infinite | −0.2893 | | | |
| S1 | aspheric | 1.1751 | 0.5651 | 1.55 | 56.1 | 0.2109 |
| S2 | aspheric | 4.2391 | 0.0985 | | | −29.8828 |
| S3 | aspheric | −23.1258 | 0.2000 | 1.68 | 19.2 | 99.0000 |
| S4 | aspheric | 7.1999 | 0.2217 | | | 21.8611 |
| S5 | aspheric | 34.6820 | 0.2726 | 1.62 | 25.8 | 99.0000 |
| S6 | aspheric | −57.4362 | 0.1818 | | | 99.0000 |
| S7 | aspheric | 20.9064 | 0.2033 | 1.68 | 19.2 | 99.0000 |
| S8 | aspheric | 6.7939 | 0.3157 | | | 5.0730 |
| S9 | aspheric | 2.8560 | 0.4225 | 1.54 | 55.7 | −11.8006 |
| S10 | aspheric | −4.4039 | 0.3462 | | | 0.0000 |
| S11 | aspheric | −4.6102 | 0.3300 | 1.54 | 55.7 | −1.9952 |
| S12 | aspheric | 1.7193 | 0.1071 | | | −15.8462 |
| S13 | spherical | infinite | 0.1100 | 1.52 | 64.2 | |
| S14 | spherical | infinite | 0.4790 | | | |
| S15 | spherical | infinite | | | | |

In Embodiment 1, the object-side surface and the image-side surface of any lens in the first to sixth lenses E1-E6 are both aspheric surfaces, and the surface type x of each aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Tables 2-1 and 2-2 below give the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S12 in Embodiment 1.

TABLE 2-1

| surface number | A4 | A6 | A8 | A10 | A12 |
|---|---|---|---|---|---|
| S1 | −3.1379E−02 | −1.1185E−02 | −4.8276E−03 | −1.6660E−03 | −5.6023E−04 |
| S2 | −3.2082E−02 | −4.9470E−03 | −8.1782E−04 | −1.1209E−04 | −7.4190E−06 |
| S3 | 2.2595E−02 | 1.1642E−02 | 1.0023E−03 | 5.9898E−04 | 7.1322E−05 |
| S4 | 3.7134E−02 | 8.8056E−03 | 1.1920E−03 | 4.9617E−04 | 1.4464E−04 |
| S5 | −8.8107E−02 | −4.5229E−03 | 4.9587E−04 | 5.7372E−04 | 1.2047E−04 |
| S6 | −1.3285E−01 | 4.4453E−03 | 4.6432E−03 | 1.8441E−03 | 9.7504E−05 |
| S7 | −2.6456E−01 | 6.4022E−02 | −1.0803E−02 | −2.6113E−03 | −1.2661E−03 |
| S8 | −3.5876E−01 | 1.0671E−01 | −3.7400E−02 | 4.5479E−04 | 2.4858E−04 |
| S9 | −7.0037E−01 | 4.8421E−02 | 4.9749E−02 | −2.7996E−03 | −1.1076E−02 |
| S10 | −7.0402E−02 | −8.4221E−02 | 2.5029E−02 | 4.8929E−03 | 4.5097E−03 |
| S11 | −2.5367E−01 | 3.3379E−01 | −1.6711E−01 | 8.5304E−02 | −3.7072E−02 |
| S12 | −1.2389E+00 | 2.5206E−01 | −4.4859E−02 | 4.8749E−02 | −1.8295E−02 |

TABLE 2-2

| surface number | A14 | A16 | A18 | A20 |
|---|---|---|---|---|
| S1 | −1.1319E−04 | −3.0118E−05 | 9.3646E−06 | −8.3850E−06 |
| S2 | −1.3854E−05 | −1.6076E−05 | −1.3315E−05 | −4.0271E−06 |
| S3 | 8.9613E−06 | −2.4088E−05 | −1.1215E−05 | −1.1297E−05 |
| S4 | 4.2123E−05 | 1.5087E−05 | 2.3047E−06 | 9.0872E−07 |
| S5 | 3.5772E−05 | −1.3459E−05 | 5.4234E−07 | −3.9992E−08 |
| S6 | −1.4702E−05 | −3.4414E−05 | −1.4605E−05 | 3.0657E−07 |
| S7 | 8.4093E−04 | −2.3775E−04 | −3.0090E−04 | −6.6381E−05 |
| S8 | 5.9527E−04 | −8.7208E−04 | −1.0281E−04 | 6.2694E−05 |
| S9 | −3.6271E−03 | −1.0799E−03 | −3.0966E−04 | 1.4857E−04 |
| S10 | 4.7099E−03 | 3.2015E−04 | −8.6271E−04 | −1.9294E−04 |
| S11 | 1.2437E−02 | −3.8405E−03 | 1.2646E−03 | −2.8141E−04 |
| S12 | 5.0633E−03 | −2.7968E−03 | 1.1763E−03 | −4.5656E−04 |

Figures 2A, 2B:
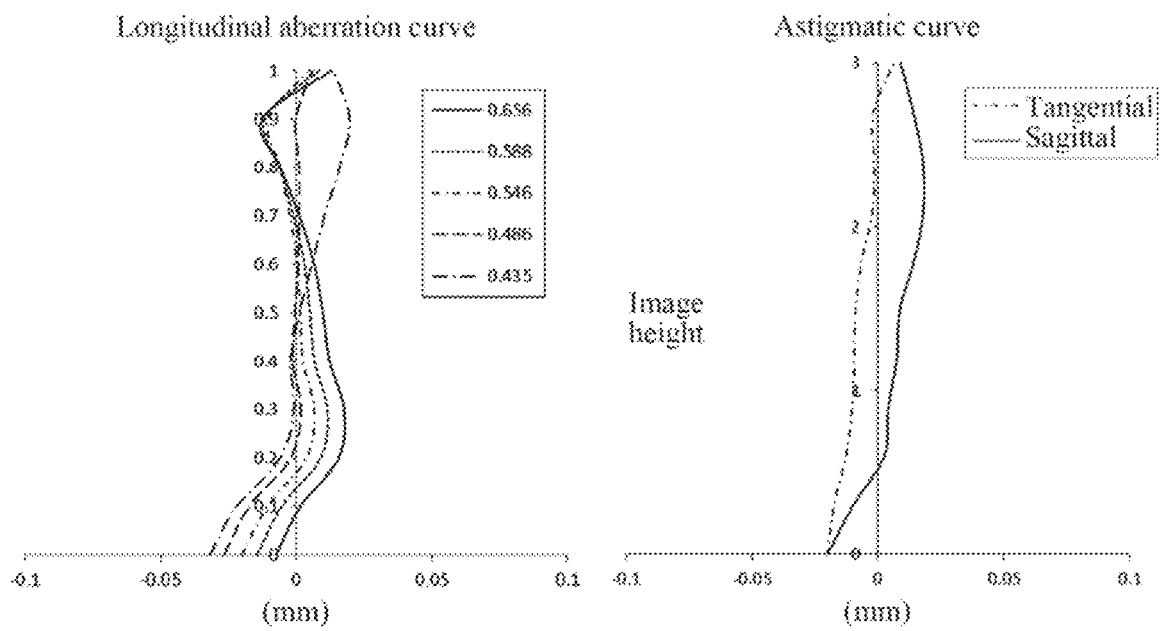
FIGS. 2A-2D respectively illustrate a longitudinal aberration curve, an astigmatic curve, a distortion curve and a lateral color curve of the optical imaging lens assembly in Embodiment 1.
Figures 2C, 2D:
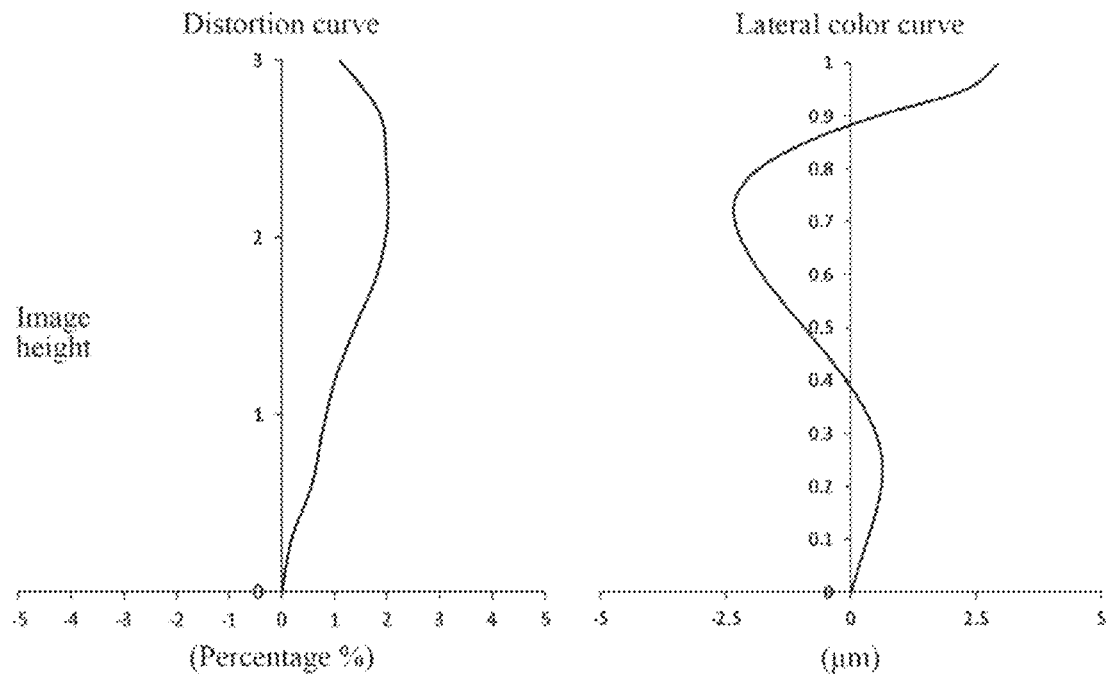

FIG. 2A illustrates a longitudinal aberration curve of the optical imaging lens assembly in Embodiment 1, representing deviations of focal points converged by light of different wavelengths which passes through the lens assembly. FIG. 2B illustrates an astigmatic curve of the optical imaging lens assembly in Embodiment 1, representing a curvature of a tangential image plane and a curvature of a sagittal image plane. FIG. 2C illustrates a distortion curve of the optical imaging lens assembly in Embodiment 1, representing amounts of distortion corresponding to different image heights. FIG. 2D illustrates a lateral color curve of the optical imaging lens assembly in Embodiment 1, representing deviations of different image heights on the image plane formed by light passing through the lens assembly. It can be seen from FIGS. 2A-2D that the optical imaging lens assembly given in Embodiment 1 can achieve a good imaging quality.

Embodiment 2

Figure 3:
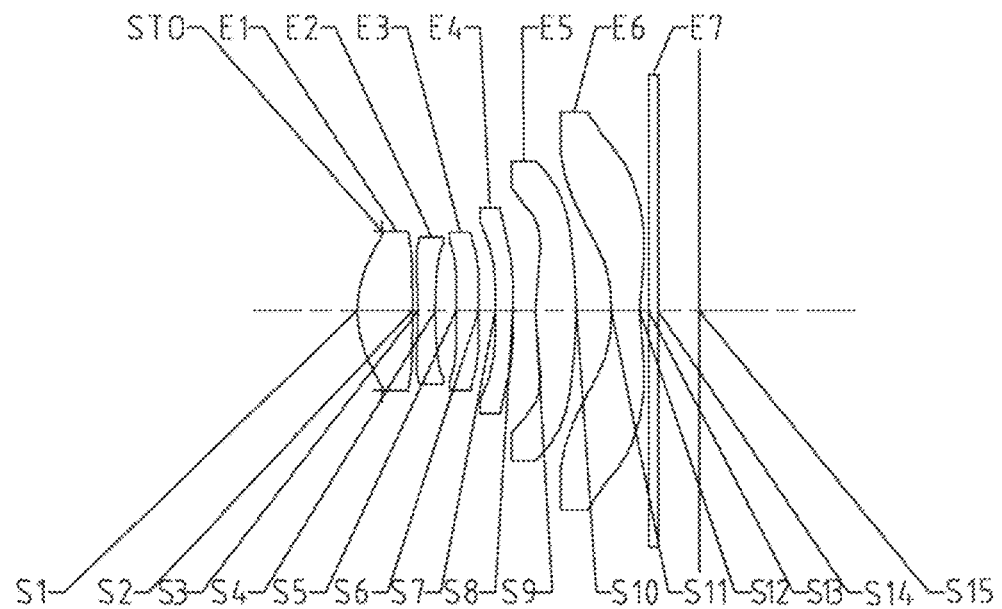
FIG. 3 is a schematic structural diagram of an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the sake of brevity, some descriptions similar to those in Embodiment 1 will be omitted. FIG. 3 is a schematic structural diagram of the optical imaging lens assembly according to Embodiment 2 of the present disclosure.

As shown in FIG. 3, the optical imaging lens assembly includes, sequentially along an optical axis from an object side to an image side, a stop STO, a first lens E1, a second lens E2, a third lens E3, a fourth lens E4, a fifth lens E5 and a sixth lens E6 and an optical filter E7.

The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The optical filter E7 has an object-side surface S13 and an image-side surface S14. The optical imaging lens assembly has an image plane S15, and light from an object sequentially passes through the surfaces S1-S14 and finally forms an image on the image plane S15.

Table 3 shows basic parameters of the optical imaging lens assembly in Embodiment 2. Here, the units of a radius of curvature and a thickness/distance are millimeters (mm). Tables 4-1 and 4-2 show the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S12 in Embodiment 2. Here, the surface type of each aspheric surface may be defined using the formula (1) given in Embodiment 1.

TABLE 3

| surface number | surface type | radius of curvature | thickness/ distance | material refractive index | abbe number | conic coefficient |
|---|---|---|---|---|---|---|
| OBJ | spherical | infinite | 400.0000 | | | |
| STO | spherical | infinite | −0.2893 | | | |
| S1 | aspheric | 1.3494 | 0.6419 | 1.55 | 56.1 | 0.1562 |
| S2 | aspheric | −99.9831 | 0.0609 | | | −98.9519 |
| S3 | aspheric | −6.8622 | 0.2000 | 1.68 | 19.2 | −99.0000 |
| S4 | aspheric | 6.9836 | 0.2409 | | | −83.9040 |
| S5 | aspheric | 7.9951 | 0.2619 | 1.62 | 25.8 | 2.5889 |
| S6 | aspheric | 9.0558 | 0.1937 | | | 17.6741 |
| S7 | aspheric | 16.2161 | 0.2033 | 1.68 | 19.2 | −61.5361 |
| S8 | aspheric | 6.0277 | 0.2586 | | | −19.6515 |
| S9 | aspheric | 2.5573 | 0.4756 | 1.54 | 55.7 | −20.0560 |
| S10 | aspheric | −4.4336 | 0.4024 | | | 0.0000 |
| S11 | aspheric | −4.1031 | 0.3300 | 1.54 | 55.7 | −1.8569 |
| S12 | aspheric | 1.7829 | 0.1025 | | | −17.2035 |
| S13 | spherical | infinite | 0.1100 | 1.52 | 64.2 | |
| S14 | spherical | infinite | 0.4790 | | | |
| S15 | spherical | infinite | | | | |

TABLE 4-1

| surface number | A4 | A6 | A8 | A10 | A12 |
|---|---|---|---|---|---|
| S1 | −4.0774E−02 | −1.0166E−02 | −2.7250E−03 | −4.1856E−04 | −5.3793E−05 |
| S2 | −3.2107E−02 | −3.1921E−03 | −5.3193E−04 | 3.4538E−04 | 3.9712E−05 |
| S3 | 4.1432E−02 | 7.1278E−03 | 6.2904E−04 | 6.9780E−04 | 8.1901E−07 |
| S4 | 3.4067E−02 | 2.3265E−03 | 1.7520E−04 | 1.6558E−04 | 6.6441E−05 |
| S5 | −9.2490E−02 | −2.0789E−03 | 3.6520E−04 | 4.6589E−04 | 1.3205E−04 |
| S6 | −1.4258E−01 | 4.7428E−03 | 2.4954E−03 | 1.6309E−03 | 1.6368E−04 |
| S7 | −2.9404E−01 | 3.9262E−02 | −1.3225E−02 | 1.3857E−03 | 1.5460E−03 |
| S8 | −3.8395E−01 | 1.0896E−01 | −3.8261E−02 | 1.7678E−03 | 1.7367E−03 |
| S9 | −7.0308E−01 | 1.0215E−01 | 8.3426E−02 | −6.7108E−03 | −1.6897E−02 |
| S10 | −7.0402E−02 | −8.4221E−02 | 2.5029E−02 | 4.8929E−03 | 4.5097E−03 |
| S11 | −2.5612E−01 | 3.3314E−01 | −1.7016E−01 | 8.1347E−02 | −3.4756E−02 |
| S12 | −1.2719E+00 | 2.3411E−01 | −4.8701E−02 | 4.5734E−02 | −1.9475E−02 |

TABLE 4-2

| surface number | A14 | A16 | A18 | A20 |
|---|---|---|---|---|
| S1 | 4.7330E−05 | 5.5138E−06 | 1.5182E−05 | 2.7647E−06 |
| S2 | −3.3786E−05 | −2.4431E−05 | −1.8777E−05 | 1.1693E−05 |
| S3 | 1.5243E−05 | −1.5509E−05 | −1.1703E−05 | −9.1052E−06 |
| S4 | −1.4749E−07 | 1.9119E−05 | −1.6489E−05 | 6.1903E−06 |
| S5 | 5.8575E−05 | 8.1639E−06 | 2.1329E−06 | −4.3283E−07 |
| S6 | 1.6115E−04 | −6.0616E−06 | 2.3445E−05 | −5.2195E−06 |
| S7 | 2.1024E−03 | 2.8915E−04 | −4.0239E−05 | −6.5015E−05 |
| S8 | 9.4460E−04 | −1.1625E−03 | −2.0122E−04 | 5.0495E−05 |
| S9 | −2.9131E−03 | 3.0365E−03 | 2.3397E−03 | 1.0361E−03 |
| S10 | 4.7099E−03 | 3.2015E−04 | −8.6271E−04 | −1.9294E−04 |
| S11 | 1.1302E−02 | −4.2400E−03 | 1.6786E−03 | −5.0006E−04 |
| S12 | 5.4709E−03 | −3.3089E−03 | 1.2664E−03 | −5.3288E−04 |

Figure 4A:
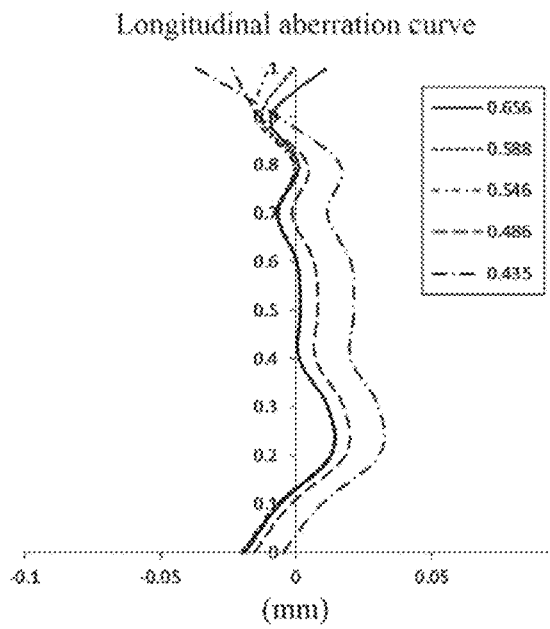
FIGS. 4A-4D respectively illustrate a longitudinal aberration curve, an astigmatic curve, a distortion curve and a lateral color curve of the optical imaging lens assembly in Embodiment 2.
Figure 4B:
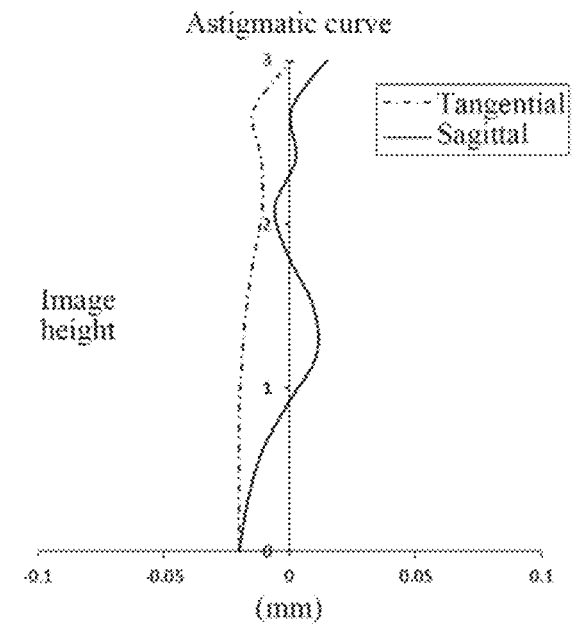
Figure 4C:
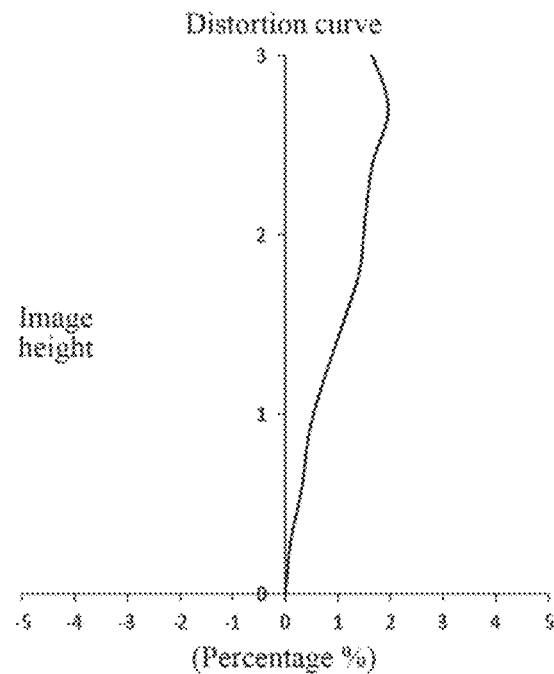
Figure 4D:
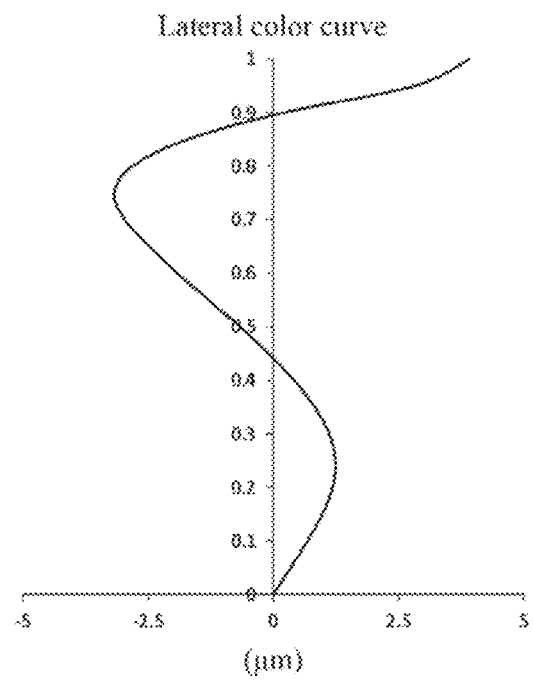

FIG. 4A illustrates a longitudinal aberration curve of the optical imaging lens assembly in Embodiment 2, representing deviations of focal points converged by light of different wavelengths which passes through the lens assembly. FIG. 4B illustrates an astigmatic curve of the optical imaging lens assembly in Embodiment 2, representing a curvature of a tangential image plane and a curvature of a sagittal image plane. FIG. 4C illustrates a distortion curve of the optical imaging lens assembly in Embodiment 2, representing amounts of distortion corresponding to different image heights. FIG. 4D illustrates a lateral color curve of the optical imaging lens assembly in Embodiment 2, representing deviations of different image heights on the image plane formed by light passing through the lens assembly. It can be seen from FIGS. 4A-4D that the optical imaging lens assembly given in Embodiment 2 can achieve a good imaging quality.

Embodiment 3

Figure 5:
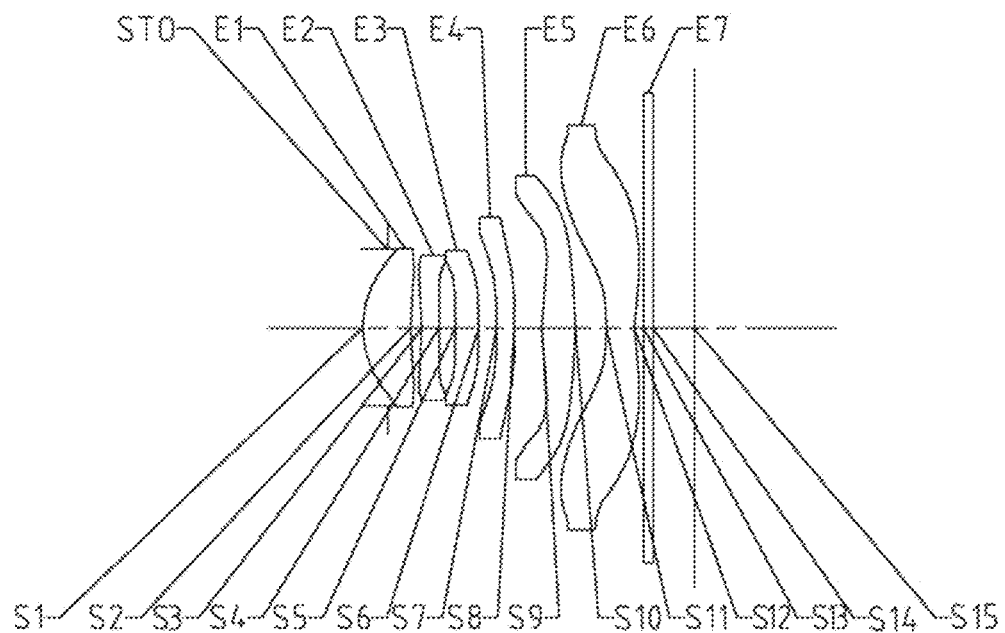
FIG. 5 is a schematic structural diagram of an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram of the optical imaging lens assembly according to Embodiment 3 of the present disclosure.

As shown in FIG. 5, the optical imaging lens assembly includes, sequentially along an optical axis from an object side to an image side, a stop STO, a first lens E1, a second lens E2, a third lens E3, a fourth lens E4, a fifth lens E5 and a sixth lens E6 and an optical filter E7.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The optical filter E7 has an object-side surface S13 and an image-side surface S14. The optical imaging lens assembly has an image plane S15, and light from an object sequentially passes through the surfaces S1-S14 and finally forms an image on the image plane S15.

Table 5 shows basic parameters of the optical imaging lens assembly in Embodiment 3. Here, the units of a radius of curvature and a thickness/distance are millimeters (mm). Tables 6-1 and 6-2 show the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S12 in Embodiment 3. Here, the surface type of each aspheric surface may be defined using the formula (1) given in Embodiment 1.

TABLE 5

| surface number | surface type | radius of curvature | thickness/ distance | material refractive index | abbe number | conic coefficient |
|---|---|---|---|---|---|---|
| OBJ | spherical | infinite | 400.0000 | | | |
| STO | spherical | infinite | −0.2893 | | | |
| S1 | aspheric | 1.1840 | 0.5585 | 1.55 | 56.1 | 0.2077 |
| S2 | aspheric | 4.3814 | 0.1258 | | | −26.2981 |
| S3 | aspheric | −4.9497 | 0.2000 | 1.68 | 19.2 | −82.1689 |
| S4 | aspheric | −50.7202 | 0.1924 | | | 86.6862 |
| S5 | aspheric | 27.6287 | 0.2732 | 1.62 | 25.8 | 99.0000 |
| S6 | aspheric | −26.2506 | 0.2058 | | | −75.8110 |
| S7 | aspheric | 15.0000 | 0.2033 | 1.68 | 19.2 | −30.8842 |
| S8 | aspheric | 5.4685 | 0.3246 | | | −7.9962 |
| S9 | aspheric | 2.8271 | 0.3882 | 1.54 | 55.7 | −11.8643 |
| S10 | aspheric | −4.7903 | 0.3603 | | | 0.0000 |
| S11 | aspheric | −4.7189 | 0.3300 | 1.54 | 55.7 | −2.4802 |
| S12 | aspheric | 1.7326 | 0.1060 | | | −15.4505 |
| S13 | spherical | infinite | 0.1100 | 1.52 | 64.2 | |
| S14 | spherical | infinite | 0.4790 | | | |
| S15 | spherical | infinite | | | | |

TABLE 6-1

| surface number | A4 | A6 | A8 | A10 | A12 |
|---|---|---|---|---|---|
| S1 | −3.1607E−02 | −1.1875E−02 | −5.1742E−03 | −1.8054E−03 | −5.8317E−04 |
| S2 | −3.2247E−02 | −6.7714E−03 | −4.5736E−04 | −3.2769E−05 | −2.1029E−05 |
| S3 | 2.4002E−02 | 1.1889E−02 | 1.2780E−02 | 6.5128E−03 | 7.4798E−05 |
| S4 | 4.3912E−02 | 7.5775E−03 | 9.2283E−04 | 4.0091E−04 | 9.4353E−05 |
| S5 | −9.3850E−02 | −4.6947E−03 | 2.2797E−04 | 5.7625E−04 | 4.1928E−05 |
| S6 | −1.3041E−01 | 4.4632E−03 | 4.2301E−03 | 1.7556E−03 | 1.1666E−04 |
| S7 | −2.8202E−01 | 5.6479E−02 | −1.3060E−02 | 9.8034E−05 | −3.3081E−05 |
| S8 | −3.8138E−01 | 1.0416E−01 | −3.7352E−02 | 1.9939E−03 | −6.3446E−04 |
| S9 | −7.0264E−01 | 3.6004E−02 | 4.9689E−02 | −4.7840E−04 | −1.3136E−02 |

TABLE 6-1-continued

| surface number | A4 | A6 | A8 | A10 | A12 |
|---|---|---|---|---|---|
| S10 | −7.0402E−02 | −8.4221E−02 | 2.5029E−02 | 4.8929E−03 | 4.5097E−03 |
| S11 | −2.4522E−01 | 3.3523E−01 | −1.6750E−01 | 8.5227E−02 | −3.6516E−02 |
| S12 | −1.2133E+00 | 2.6676E−01 | −4.5988E−02 | 4.9520E−02 | −1.8688E−02 |

TABLE 6-2

| surface number | A14 | A16 | A18 | A20 |
|---|---|---|---|---|
| S1 | −1.1125E−04 | −4.2480E−05 | −2.7939E−06 | −3.5859E−06 |
| S2 | −1.9113E−05 | −1.0409E−05 | −2.6170E−05 | −9.5785E−06 |
| S3 | 6.6802E−06 | −1.6984E−05 | −1.6804E−05 | −3.2997E−06 |
| S4 | 4.1326E−05 | 9.8925E−06 | −2.3969E−06 | 1.4318E−06 |
| S5 | 3.9179E−05 | −2.8763E−05 | 3.2853E−06 | −1.0649E−05 |
| S6 | 2.6745E−05 | −1.3103E−05 | 5.0364E−06 | 1.1461E−05 |
| S7 | 1.7937E−03 | 3.4901E−04 | 9.5278E−06 | −5.7657E−05 |
| S8 | 4.7684E−04 | −1.1551E−03 | −3.8740E−04 | −1.6557E−04 |
| S9 | −7.6448E−03 | −4.0256E−03 | −1.6023E−03 | −2.6067E−04 |
| S10 | 4.7099E−03 | 3.2015E−04 | −8.6271E−04 | −1.9294E−04 |
| S11 | 1.2292E−02 | −3.9610E−03 | 1.3694E−03 | −3.0943E−04 |
| S12 | 5.9553E−03 | −2.8927E−03 | 1.2484E−03 | −6.5638E−04 |

Figures 6A, 6B:
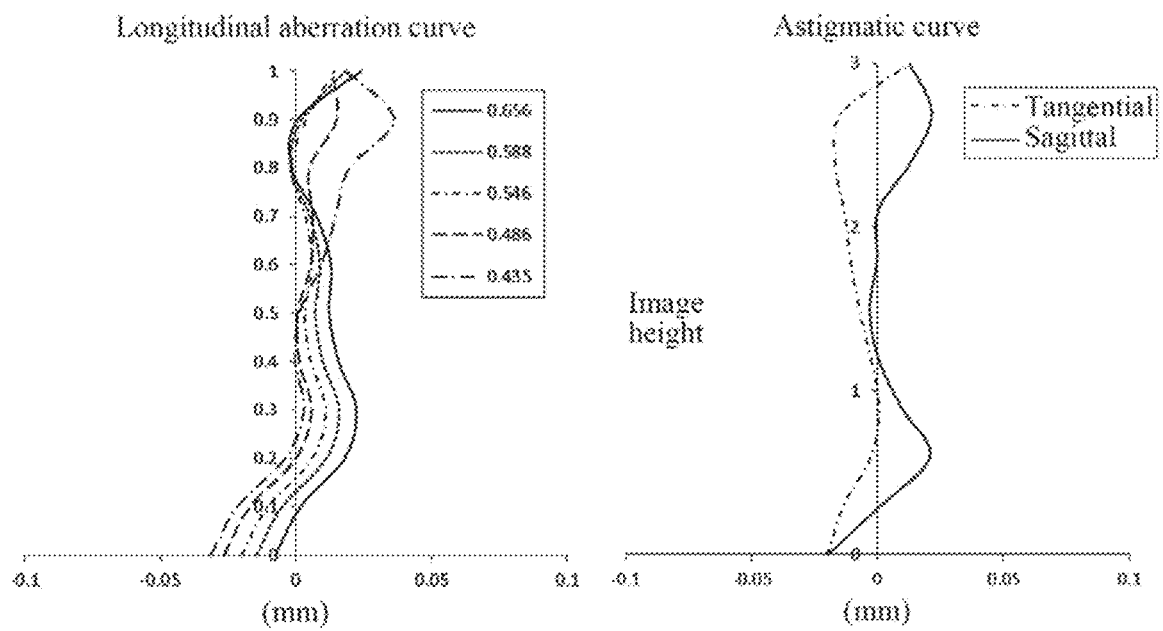
FIGS. 6A-6D respectively illustrate a longitudinal aberration curve, an astigmatic curve, a distortion curve and a lateral color curve of the optical imaging lens assembly in Embodiment 3.
Figures 6C, 6D:
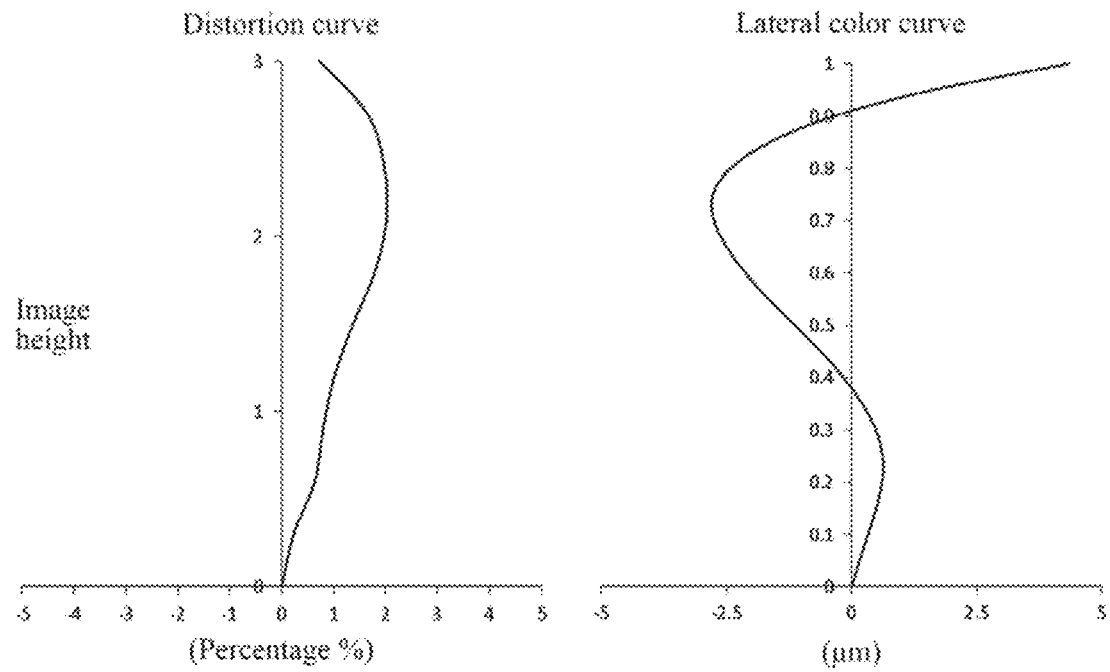

FIG. 6A illustrates a longitudinal aberration curve of the optical imaging lens assembly in Embodiment 3, representing deviations of focal points converged by light of different wavelengths which passes through the lens assembly. FIG. 6B illustrates an astigmatic curve of the optical imaging lens assembly in Embodiment 3, representing a curvature of a tangential image plane and a curvature of a sagittal image plane. FIG. 6C illustrates a distortion curve of the optical imaging lens assembly in Embodiment 3, representing amounts of distortion corresponding to different image heights. FIG. 6D illustrates a lateral color curve of the optical imaging lens assembly in Embodiment 3, representing deviations of different image heights on the image plane formed by light passing through the lens assembly. It can be seen from FIGS. 6A-6D that the optical imaging lens assembly given in Embodiment 3 can achieve a good imaging quality.

Embodiment 4

Figure 7:
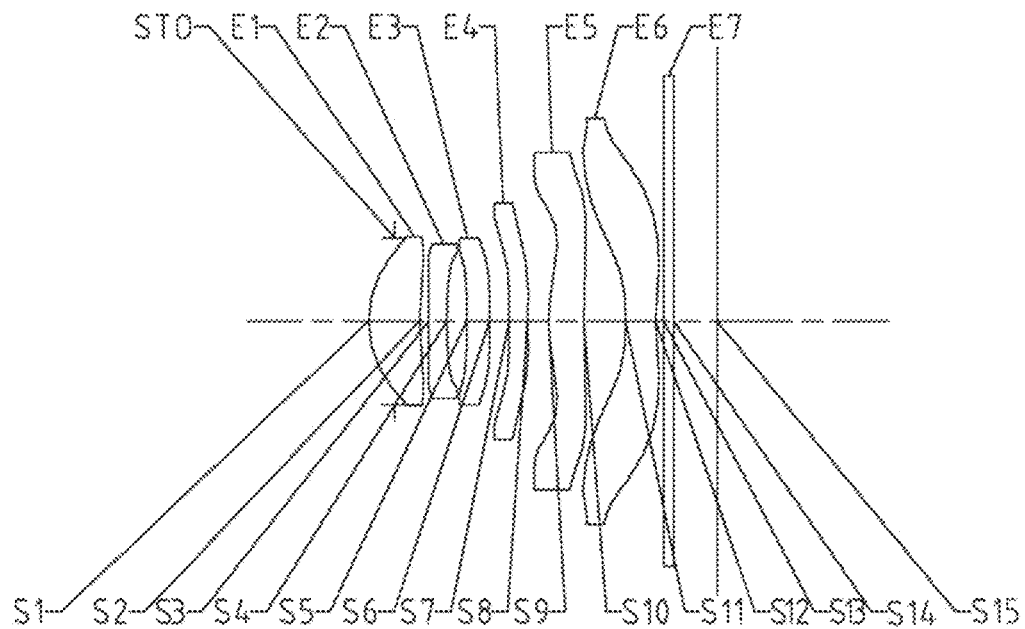
FIG. 7 is a schematic structural diagram of an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram of the optical imaging lens assembly according to Embodiment 4 of the present disclosure.

As shown in FIG. 7, the optical imaging lens assembly includes, sequentially along an optical axis from an object side to an image side, a stop STO, a first lens E1, a second lens E2, a third lens E3, a fourth lens E4, a fifth lens E5 and a sixth lens E6 and an optical filter E7.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a concave surface. The optical filter E7 has an object-side surface S13 and an image-side surface S14. The optical imaging lens assembly has an image plane S15, and light from an object sequentially passes through the surfaces S1-S14 and finally forms an image on the image plane S15.

Table 7 shows basic parameters of the optical imaging lens assembly in Embodiment 4. Here, the units of a radius of curvature and a thickness/distance are millimeters (mm). Tables 8-1 and 8-2 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 4. Here, the surface type of each aspheric surface may be defined using the formula (1) given in Embodiment 1.

TABLE 7

| surface number | surface type | radius of curvature | thickness/ distance | material refractive index | abbe number | conic coefficient |
|---|---|---|---|---|---|---|
| OBJ | spherical | infinite | 400.0000 | | | |
| STO | spherical | infinite | −0.2893 | | | |
| S1 | aspheric | 1.1662 | 0.5637 | 1.55 | 56.1 | 0.1938 |
| S2 | aspheric | 3.7984 | 0.0984 | | | −30.2255 |

TABLE 7-continued

| surface number | surface type | radius of curvature | thickness/ distance | material refractive index | abbe number | conic coefficient |
|---|---|---|---|---|---|---|
| S3 | aspheric | −20.9258 | 0.2000 | 1.68 | 19.2 | −61.2995 |
| S4 | aspheric | 7.9112 | 0.2170 | | | 49.7904 |
| S5 | aspheric | 13.3965 | 0.2562 | 1.62 | 25.8 | 69.4175 |
| S6 | aspheric | 15.2071 | 0.2133 | | | −8.0076 |
| S7 | aspheric | 8.4185 | 0.2033 | 1.68 | 19.2 | −3.9911 |
| S8 | aspheric | 3.8597 | 0.2327 | | | −34.7360 |
| S9 | aspheric | 1.7922 | 0.3881 | 1.54 | 55.7 | −8.8870 |
| S10 | aspheric | 80.0000 | 0.4623 | | | −99.0000 |
| S11 | aspheric | −6.2281 | 0.3300 | 1.54 | 55.7 | −1.0947 |
| S12 | aspheric | 2.0573 | 0.0886 | | | −25.3427 |
| S13 | spherical | infinite | 0.1100 | 1.52 | 64.2 | |
| S14 | spherical | infinite | 0.4790 | | | |
| S15 | spherical | infinite | | | | |

TABLE 8-1

| surface number | A4 | A6 | A8 | A10 | A12 | A14 | A16 |
|---|---|---|---|---|---|---|---|
| S1 | −3.6267E−02 | −1.1372E−02 | −5.2222E−03 | −1.5879E−03 | −6.2361E−04 | −6.0354E−05 | −5.6431E−05 |
| S2 | −3.2799E−02 | −5.6882E−03 | −5.9010E−04 | −1.1458E−04 | −4.6084E−06 | −3.2488E−05 | −2.5410E−05 |
| S3 | 2.5584E−02 | 1.1641E−02 | 9.4653E−04 | 5.9607E−04 | 9.7850E−05 | 2.3344E−06 | −2.2896E−05 |
| S4 | 4.0200E−02 | 9.8905E−03 | 1.1095E−03 | 5.9708E−04 | 1.2273E−04 | 6.7181E−05 | −4.3892E−07 |
| S5 | −9.1119E−02 | −2.0667E−03 | 5.6396E−04 | 7.1223E−04 | 1.2570E−04 | 1.0563E−04 | 4.6093E−08 |
| S6 | −1.3802E−01 | 5.3967E−03 | 3.5357E−03 | 1.7667E−03 | −4.7495E−05 | 8.3691E−05 | −6.9088E−05 |
| S7 | −2.7616E−01 | 5.5910E−02 | −9.2339E−03 | −1.0193E−03 | −1.8563E−03 | 6.9670E−04 | 1.3837E−05 |
| S8 | −3.8259E−01 | 1.1237E−01 | −3.8812E−02 | 2.9904E−03 | −3.6577E−04 | 1.2472E−03 | −5.7045E−04 |
| S9 | −6.6139E−01 | 7.8196E−02 | 4.5718E−02 | −1.5011E−04 | −8.4848E−03 | −8.6038E−04 | −1.0659E−04 |
| S10 | −1.3548E−01 | −5.8643E−02 | 2.2560E−02 | −6.1516E−04 | 4.2333E−04 | 3.2983E−03 | −2.4423E−04 |
| S11 | −2.7075E−01 | 3.2549E−01 | −1.6513E−01 | 8.6714E−02 | −3.8316E−02 | 1.2371E−02 | −4.1221E−03 |
| S12 | −1.2616E+00 | 3.1761E−01 | −3.1851E−02 | 3.3718E−02 | −2.2435E−02 | 5.7009E−03 | −1.7514E−03 |

TABLE 8-2

| surface number | A18 | A20 | A22 | A24 | A26 | A28 | A30 |
|---|---|---|---|---|---|---|---|
| S1 | 2.6374E−05 | −2.2678E−05 | 2.0929E−06 | −2.5362E−05 | −3.5413E−06 | −4.6548E−06 | 1.2613E−05 |
| S2 | −2.0337E−05 | −4.0452E−06 | 2.1219E−06 | −5.1894E−07 | −1.3036E−06 | 2.3415E−06 | 6.7277E−06 |
| S3 | −1.8429E−05 | −2.6370E−06 | 7.7470E−06 | 4.9406E−07 | 1.8126E−06 | 6.0541E−06 | 4.0076E−06 |
| S4 | 1.4902E−05 | −1.1114E−06 | 1.1162E−05 | −1.2315E−07 | 1.4020E−06 | −4.9712E−06 | −9.8563E−07 |
| S5 | 1.7833E−05 | 1.5865E−06 | 8.5385E−06 | 1.1631E−06 | 6.8647E−07 | 1.1913E−06 | −7.1470E−07 |
| S6 | 1.5467E−05 | −2.4146E−05 | 1.0828E−05 | −4.4097E−06 | 7.3855E−06 | −1.3378E−06 | −1.7801E−06 |
| S7 | −5.1804E−05 | 1.4351E−04 | 9.9708E−05 | 7.8358E−05 | 3.9128E−05 | 3.6870E−05 | 8.8276E−07 |
| S8 | 2.6411E−04 | 4.1803E−04 | 1.2937E−04 | 1.3009E−04 | 8.8804E−05 | 6.1600E−05 | −1.7065E−05 |
| S9 | 4.3578E−04 | 7.4693E−04 | −1.3894E−04 | −4.3523E−04 | −9.8643E−05 | 2.1386E−04 | 9.4061E−05 |
| S10 | −6.4826E−04 | 1.4674E−04 | −6.4533E−05 | −1.7897E−05 | −1.2711E−05 | 2.1145E−05 | 6.5706E−07 |
| S11 | 1.4244E−03 | −4.4421E−04 | −9.4902E−06 | 8.2457E−06 | 5.0294E−05 | −5.4473E−05 | 3.0138E−06 |
| S12 | 8.0390E−04 | 2.0020E−05 | −3.6009E−04 | 2.9539E−04 | 5.8008E−04 | 5.8072E−04 | 2.8759E−05 |

Figure 8A:
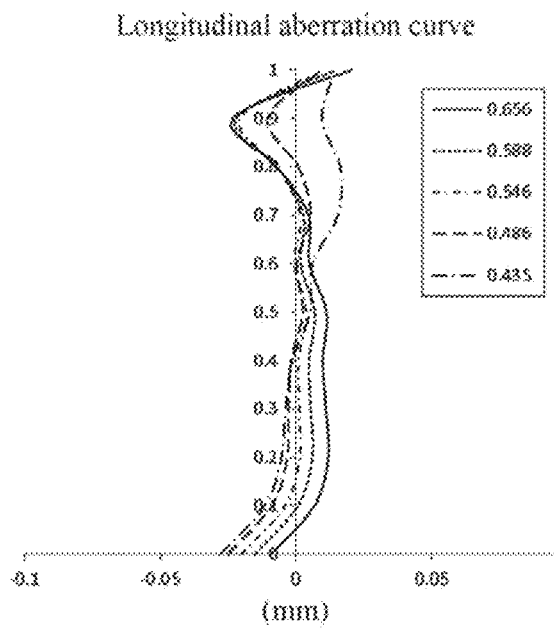
FIGS. 8A-8D respectively illustrate a longitudinal aberration curve, an astigmatic curve, a distortion curve and a lateral color curve of the optical imaging lens assembly in Embodiment 4.
Figure 8B:
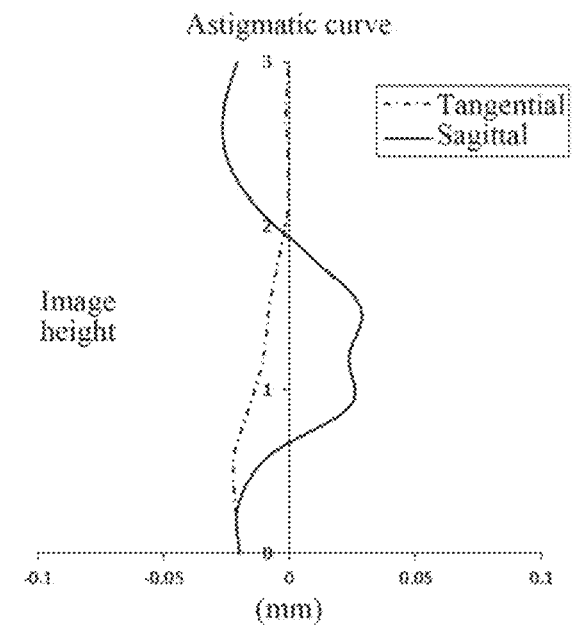
Figure 8C:
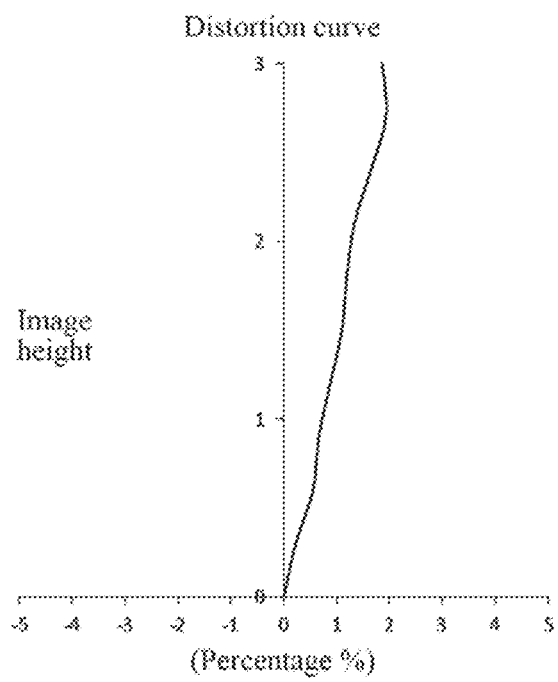
Figure 8D:
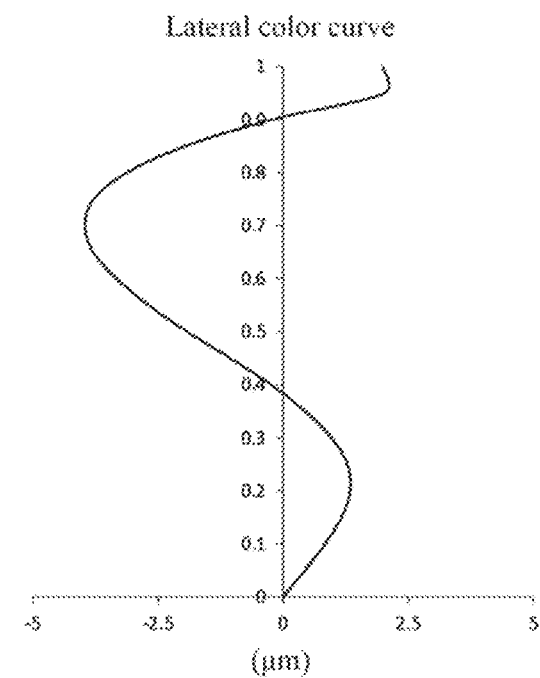

FIG. 8A illustrates a longitudinal aberration curve of the optical imaging lens assembly in Embodiment 4, representing deviations of focal points converged by light of different wavelengths which passes through the lens assembly. FIG. 8B illustrates an astigmatic curve of the optical imaging lens assembly in Embodiment 4, representing a curvature of a tangential image plane and a curvature of a sagittal image plane. FIG. 8C illustrates a distortion curve of the optical imaging lens assembly in Embodiment 4, representing amounts of distortion corresponding to different image heights. FIG. 8D illustrates a lateral color curve of the optical imaging lens assembly in Embodiment 4, representing deviations of different image heights on the image plane formed by light passing through the lens assembly. It can be seen from FIGS. 8A-8D that the optical imaging lens assembly given in Embodiment 4 can Embodiment 5

Figure 9:
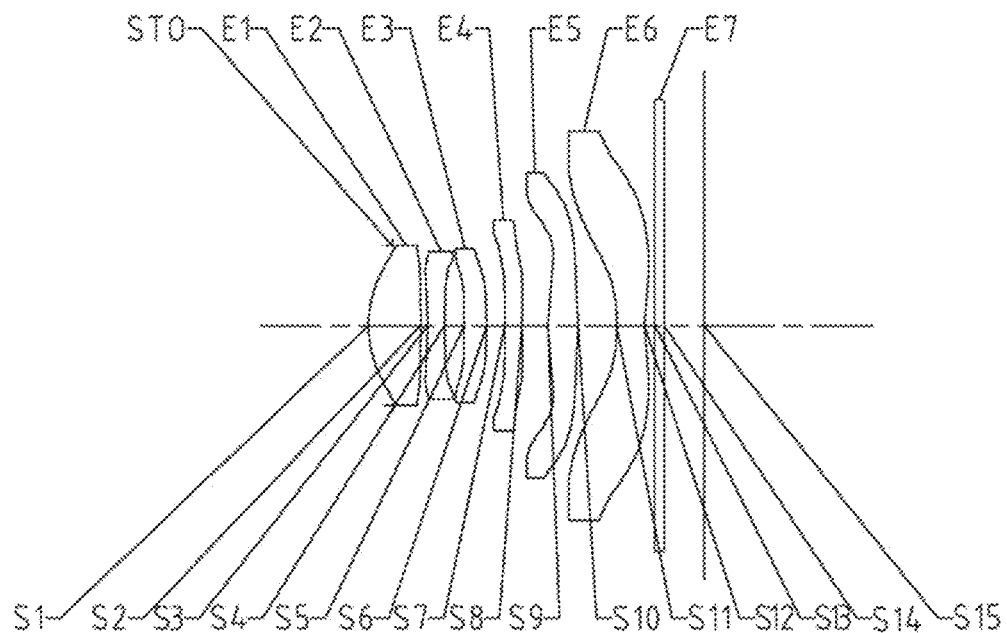
FIG. 9 is a schematic structural diagram of an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram of the optical imaging lens assembly according to Embodiment 5 of the present disclosure.

As shown in FIG. 9, the optical imaging lens assembly includes, sequentially along an optical axis from an object side to an image side, a stop STO, a first lens E1, a second lens E2, a third lens E3, a fourth lens E4, a fifth lens E5 and a sixth lens E6 and an optical filter E7.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The optical filter E7 has an object-side surface S13 and an image-side surface S14. The optical imaging lens assembly has an image plane S15, and light from an object sequentially passes through the surfaces S1-S14 and finally forms an image on the image plane S15.

Table 9 shows basic parameters of the optical imaging lens assembly in Embodiment 5. Here, the units of a radius of curvature and a thickness/distance are millimeters (mm). Tables 10-1 and 10-2 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 5. Here, the surface type of each aspheric surface may be defined using the formula (1) given in Embodiment 1.

TABLE 9

| surface number | surface type | radius of curvature | thickness/ distance | material refractive index | abbe number | conic coefficient |
|---|---|---|---|---|---|---|
| OBJ | spherical | infinite | 400.0000 | | | |
| STO | spherical | infinite | −0.2893 | | | |
| S1 | aspheric | 1.3458 | 0.6277 | 1.55 | 56.1 | 0.1925 |
| S2 | aspheric | 54.7884 | 0.0840 | | | −99.0000 |
| S3 | aspheric | −4.2410 | 0.2000 | 1.68 | 19.2 | −98.3373 |
| S4 | aspheric | 19.1248 | 0.2363 | | | 73.0239 |
| S5 | aspheric | −80.0000 | 0.2682 | 1.62 | 25.8 | −99.0000 |
| S6 | aspheric | −19.8827 | 0.2142 | | | −99.0000 |
| S7 | aspheric | 4.2655 | 0.2033 | 1.68 | 19.2 | −32.8842 |
| S8 | aspheric | 3.0194 | 0.3108 | | | −22.4251 |
| S9 | aspheric | 2.4653 | 0.3595 | 1.54 | 55.7 | −12.7090 |
| S10 | aspheric | −6.3881 | 0.4636 | | | −0.4915 |
| S11 | aspheric | −4.3610 | 0.3300 | 1.54 | 55.7 | −1.5856 |
| S12 | aspheric | 1.8161 | 0.1241 | | | −15.2151 |
| S13 | spherical | infinite | 0.1100 | 1.52 | 64.2 | |
| S14 | spherical | infinite | 0.4790 | | | |
| S15 | spherical | infinite | | | | |

TABLE 10-1

| surface number | A4 | A6 | A8 | A10 | A12 | A14 | A16 |
|---|---|---|---|---|---|---|---|
| S1 | −3.9704E−02 | −9.7261E−03 | −2.5275E−03 | −3.5874E−04 | −5.1234E−05 | 2.8961E−05 | −1.4585E−05 |
| S2 | −3.3744E−02 | −1.5992E−03 | −2.5774E−04 | −9.7036E−05 | −1.9465E−05 | −1.6928E−05 | 3.8685E−05 |
| S3 | 3.4839E−02 | 1.0530E−02 | 4.2331E−04 | 1.2764E−04 | −1.1270E−04 | 3.3835E−05 | 1.6968E−05 |
| S4 | 3.8140E−02 | 3.4561E−03 | 1.5364E−04 | 2.8265E−04 | −1.5515E−05 | 2.0037E−05 | −5.2849E−06 |
| S5 | −9.3508E−02 | −1.1680E−04 | 8.6164E−04 | 5.7007E−04 | 7.9718E−05 | 5.1047E−05 | 6.4596E−06 |
| S6 | −1.3566E−01 | 9.2990E−03 | 2.4107E−03 | 1.0073E−03 | −5.5306E−06 | 7.0868E−05 | 2.1423E−05 |
| S7 | −2.8428E−01 | 4.9345E−02 | −1.7914E−02 | −1.9491E−03 | −1.4474E−03 | 1.3554E−03 | 1.9025E−04 |
| S8 | −3.7357E−01 | 1.2140E−01 | −3.1320E−02 | 2.6282E−04 | −1.9388E−03 | 3.5996E−04 | −2.6088E−03 |
| S9 | −6.7596E−01 | 8.0191E−02 | 6.0985E−02 | −5.1277E−03 | −1.4011E−02 | −1.8019E−03 | 5.0922E−04 |
| S10 | −6.7734E−02 | −8.3613E−02 | 2.4790E−02 | 4.7007E−03 | 4.0648E−03 | 4.3431E−03 | 5.5788E−04 |
| S11 | −2.6438E−01 | 3.3236E−01 | −1.7030E−01 | 7.7222E−02 | −3.6536E−02 | 1.2627E−02 | 1.9427E−04 |
| S12 | −1.2648E+00 | 2.7874E−01 | −4.3977E−02 | 4.7819E−02 | −2.4191E−02 | 4.9341E−04 | −4.6613E−03 |

TABLE 10-2

| surface number | A18 | A20 | A22 | A24 | A26 | A28 | A30 |
|---|---|---|---|---|---|---|---|
| S1 | 6.5729E−06 | 2.0775E−06 | 2.6381E−06 | −5.8613E−07 | −2.7610E−06 | −1.4900E−06 | 1.0280E−06 |
| S2 | −2.0971E−05 | 9.6299E−08 | −5.0904E−06 | 1.7916E−06 | −4.0913E−07 | 1.3496E−06 | −4.1854E−07 |
| S3 | −9.9670E−06 | −2.2837E−05 | −1.7657E−06 | 4.1093E−06 | 5.6975E−06 | 1.2225E−06 | −2.0832E−06 |
| S4 | 7.9231E−06 | −9.5603E−08 | 9.3835E−08 | 2.8277E−08 | 1.3161E−08 | 6.9036E−09 | 3.7073E−09 |
| S5 | 3.9591E−06 | 5.2093E−06 | 9.5144E−07 | 3.9448E−07 | 1.1120E−07 | −3.1821E−09 | −3.3559E−08 |
| S6 | 3.4632E−06 | 7.8204E−06 | 1.2238E−06 | 3.0567E−06 | −8.7480E−08 | 6.0878E−08 | −7.2699E−08 |
| S7 | 1.4630E−04 | −5.4901E−06 | −3.4873E−05 | −8.4606E−05 | −4.4044E−05 | −2.4005E−05 | 5.7015E−06 |
| S8 | −1.2651E−03 | −5.7428E−04 | −7.9858E−05 | 1.7055E−05 | 1.3459E−04 | 9.4898E−05 | 5.6979E−05 |
| S9 | 1.2400E−04 | 3.3034E−04 | 6.5443E−06 | −2.5462E−04 | −1.1652E−04 | −1.1538E−05 | 2.4080E−05 |
| S10 | −1.0766E−03 | −8.6469E−06 | −5.0443E−04 | −3.8407E−04 | −1.8281E−04 | −1.0472E−04 | −4.6995E−05 |
| S11 | 1.9945E−03 | 1.0429E−03 | 1.9637E−04 | −5.5577E−05 | −2.5656E−05 | −1.7277E−04 | −1.3906E−04 |
| S12 | −2.3407E−04 | −4.9941E−04 | 2.9792E−05 | 1.0611E−04 | 1.3589E−04 | 1.3149E−04 | −5.5565E−06 |

Figures 10A, 10B:
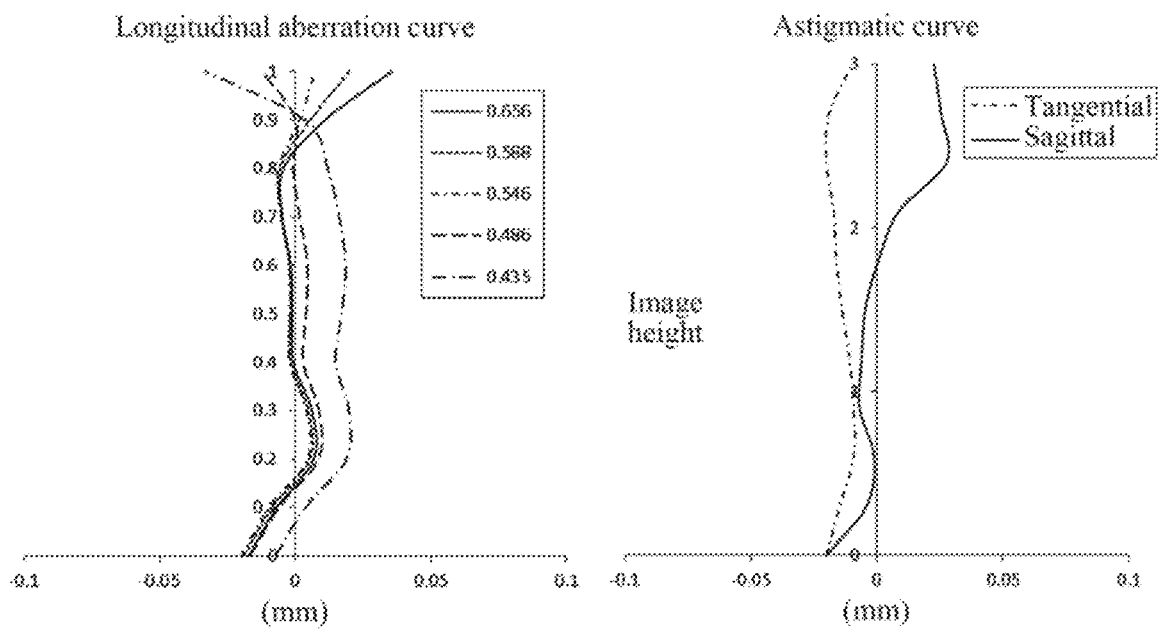
FIGS. 10A-10D respectively illustrate a longitudinal aberration curve, an astigmatic curve, a distortion curve and a lateral color curve of the optical imaging lens assembly in Embodiment 5.
Figures 10C, 10D:
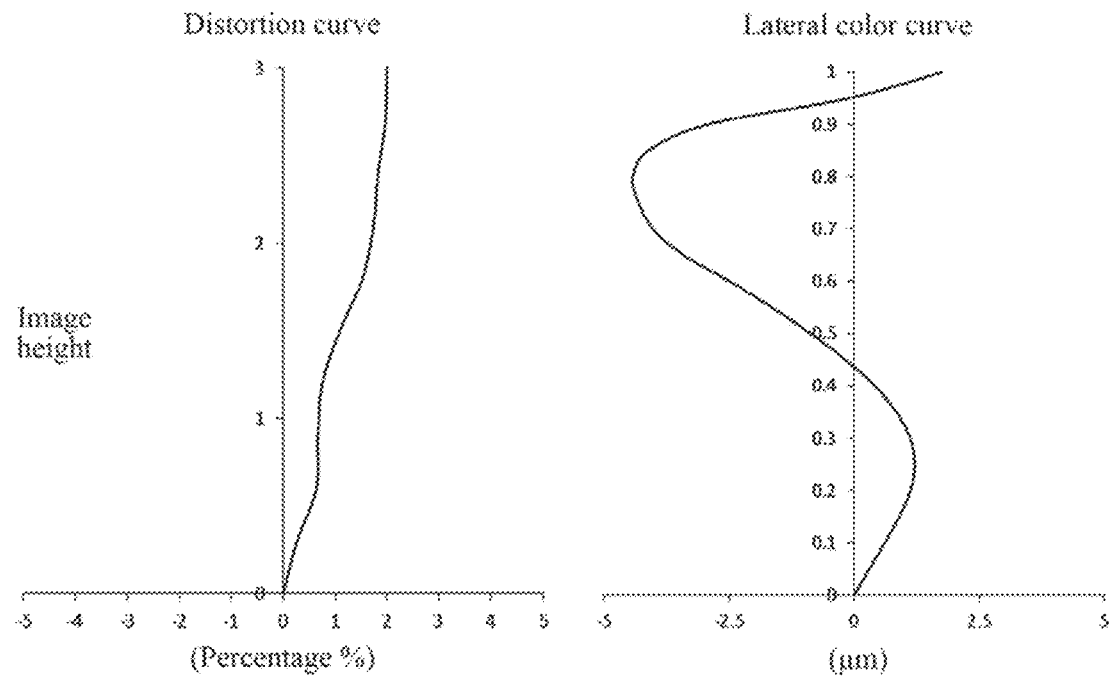

FIG. 10A illustrates a longitudinal aberration curve of the optical imaging lens assembly in Embodiment 5, representing deviations of focal points converged by light of different wavelengths which passes through the lens assembly. FIG. 10B illustrates an astigmatic curve of the optical imaging lens assembly in Embodiment 5, representing a curvature of a tangential image plane and a curvature of a sagittal image plane. FIG. 10C illustrates a distortion curve of the optical imaging lens assembly in Embodiment 5, representing amounts of distortion corresponding to different image heights. FIG. 10D illustrates a lateral color curve of the optical imaging lens assembly in Embodiment 5, representing deviations of different image heights on the image plane formed by light passing through the lens assembly. It can be seen from FIGS. 10A-10D that the optical imaging lens assembly given in Embodiment 5 can achieve a good imaging quality.

Embodiment 6

Figure 11:
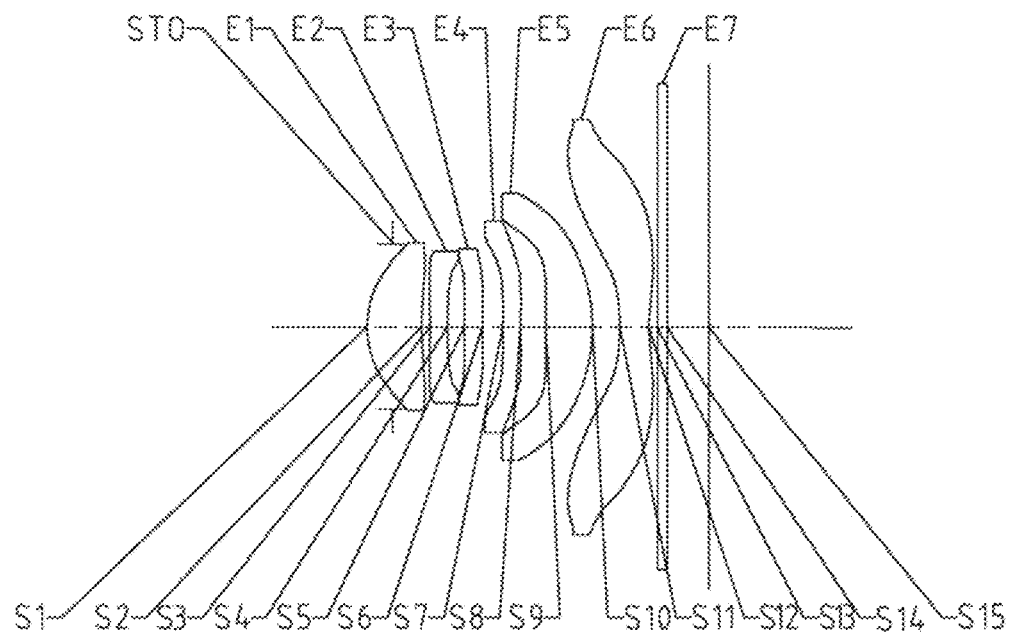
FIG. 11 is a schematic structural diagram of an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram of the optical imaging lens assembly according to Embodiment 6 of the present disclosure.

As shown in FIG. 11, the optical imaging lens assembly includes, sequentially along an optical axis from an object side to an image side, a stop STO, a first lens E1, a second lens E2, a third lens E3, a fourth lens E4, a fifth lens E5 and a sixth lens E6 and an optical filter E7.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The optical filter E7 has an object-side surface S13 and an image-side surface S14. The optical imaging lens assembly has an image plane S15, and light from an object sequentially passes through the surfaces S1-S14 and finally forms an image on the image plane S15.

Table 11 shows basic parameters of the optical imaging lens assembly in Embodiment 6. Here, the units of a radius of curvature and a thickness/distance are millimeters (mm). Tables 12-1 and 12-2 show the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S12 in Embodiment 6. Here, the surface type of each aspheric surface may be defined using the formula (1) given in Embodiment 1.

TABLE 11

| surface number | surface type | radius of curvature | thickness/ distance | material refractive index | material abbe number | conic coefficient |
|---|---|---|---|---|---|---|
| OBJ | spherical | infinite | 400.0000 | | | |
| STO | spherical | infinite | −0.2893 | | | |
| S1 | aspheric | 1.1586 | 0.6228 | 1.55 | 56.1 | 0.2177 |
| S2 | aspheric | 4.0490 | 0.0979 | | | −24.4401 |
| S3 | aspheric | −28.2736 | 0.2000 | 1.68 | 19.2 | 99.0000 |
| S4 | aspheric | 7.3459 | 0.1940 | | | 34.3204 |
| S5 | aspheric | 7.7025 | 0.2111 | 1.62 | 25.8 | 56.5408 |
| S6 | aspheric | 8.8370 | 0.2322 | | | 66.0611 |
| S7 | aspheric | 8.9714 | 0.2033 | 1.68 | 19.2 | −98.8567 |
| S8 | aspheric | 5.6960 | 0.2951 | | | −28.7298 |
| S9 | aspheric | −80.0000 | 0.5323 | 1.54 | 55.7 | 99.0000 |
| S10 | aspheric | −1.8562 | 0.3131 | | | 0.0000 |
| S11 | aspheric | −4.6393 | 0.3300 | 1.54 | 55.7 | −0.5410 |

TABLE 11-continued

| surface number | surface type | radius of curvature | thickness/ distance | refractive index | abbe number | conic coefficient |
|---|---|---|---|---|---|---|
| S12 | aspheric | 1.7964 | 0.1034 | | | −17.7909 |
| S13 | spherical | infinite | 0.1100 | 1.52 | 64.2 | |
| S14 | spherical | infinite | 0.4790 | | | |
| S15 | spherical | infinite | | | | |

TABLE 12-1

| surface number | A4 | A6 | A8 | A10 | A12 |
|---|---|---|---|---|---|
| S1 | −3.0639E−02 | −8.6794E−03 | −3.5375E−03 | −1.2086E−03 | −4.4733E−04 |
| S2 | −2.9453E−02 | −4.6288E−03 | −6.1112E−04 | 9.2314E−05 | 4.9002E−05 |
| S3 | 1.8990E−02 | 9.9882E−03 | 8.3113E−04 | 7.3011E−04 | 9.9100E−05 |
| S4 | 3.7949E−02 | 9.0659E−03 | 1.4428E−03 | 6.1874E−04 | 2.3626E−04 |
| S5 | −8.3887E−02 | −3.2467E−03 | −2.8933E−04 | 5.3332E−04 | 1.3693E−04 |
| S6 | −1.2571E−01 | 4.1014E−03 | 3.5279E−03 | 2.1837E−03 | 3.0095E−04 |
| S7 | −3.5373E−01 | 4.5711E−02 | −1.4743E−04 | −5.0850E−03 | −2.1565E−03 |
| S8 | −4.3857E−01 | 8.7079E−02 | −1.9658E−02 | −7.5117E−03 | 4.6764E−03 |
| S9 | −8.3335E−01 | 3.1250E−01 | 1.1270E−01 | −6.7641E−02 | −1.7146E−02 |
| S10 | −7.0402E−02 | −8.4221E−02 | 2.5029E−02 | 4.8929E−03 | 4.5097E−03 |
| S11 | −2.9239E−01 | 3.3938E−01 | −1.6576E−01 | 8.3079E−02 | −3.7343E−02 |
| S12 | −1.3247E+00 | 2.3165E−01 | −5.7058E−02 | 4.4246E−02 | −1.0444E−02 |

TABLE 12-2

| surface number | A14 | A16 | A18 | A20 |
|---|---|---|---|---|
| S1 | −1.0953E−04 | −3.8137E−05 | 1.2776E−05 | 4.6175E−07 |
| S2 | −1.0188E−06 | −2.7854E−06 | −2.8713E−06 | −1.3027E−06 |
| S3 | 3.0567E−05 | −3.0246E−06 | 5.4662E−06 | −7.4317E−06 |
| S4 | 5.1391E−05 | 3.3379E−05 | −3.1844E−06 | 7.2291E−06 |
| S5 | 6.6282E−05 | −5.3523E−06 | −3.5621E−06 | −4.5771E−06 |
| S6 | −6.5871E−05 | −1.4006E−04 | −6.4397E−05 | −3.3166E−05 |
| S7 | 1.0694E−04 | 1.3633E−03 | 7.6685E−04 | 3.3294E−04 |
| S8 | 1.9473E−03 | 4.0229E−05 | −1.3447E−04 | 2.7029E−04 |
| S9 | 1.7970E−02 | 1.1238E−02 | 2.0758E−03 | 4.6940E−04 |
| S10 | 4.7099E−03 | 3.2015E−04 | −8.6271E−04 | −1.9294E−04 |
| S11 | 1.4174E−02 | −4.1687E−03 | 8.5365E−04 | −9.7192E−05 |
| S12 | 6.4026E−03 | −2.3405E−03 | −1.5258E−05 | −9.4768E−05 |

Figure 12A:
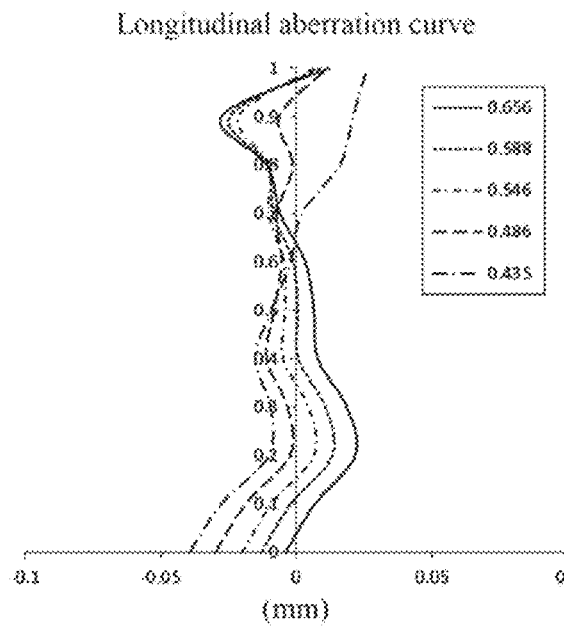
FIGS. 12A-12D respectively illustrate a longitudinal aberration curve, an astigmatic curve, a distortion curve and a lateral color curve of the optical imaging lens assembly in Embodiment 6.
Figure 12B:
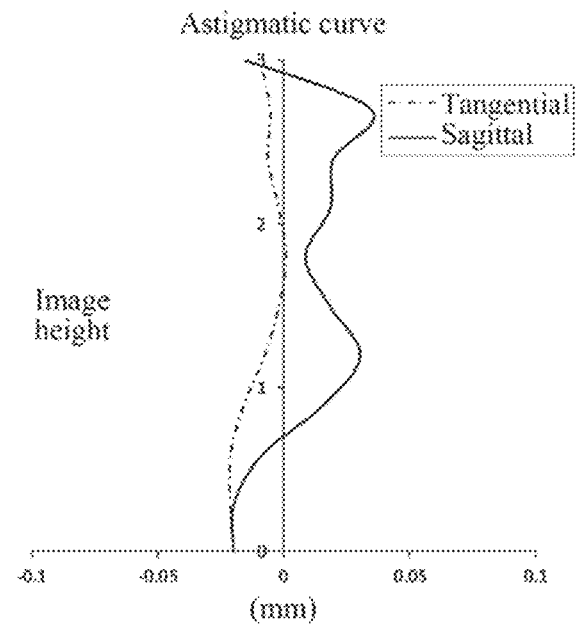
Figure 12C:
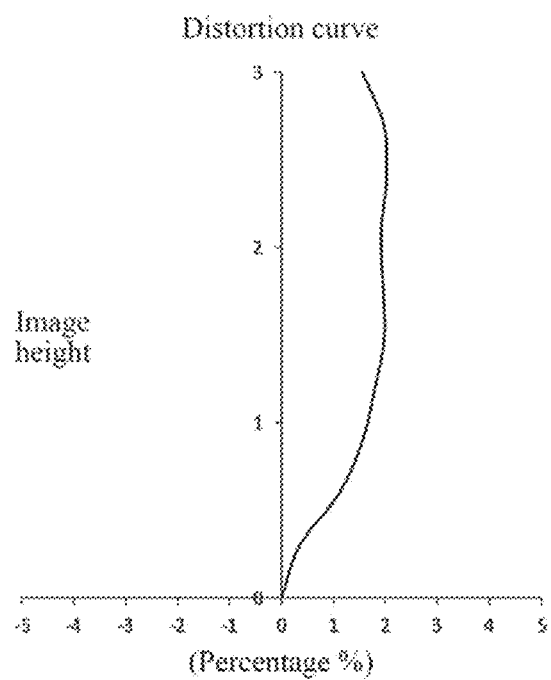
Figure 12D:
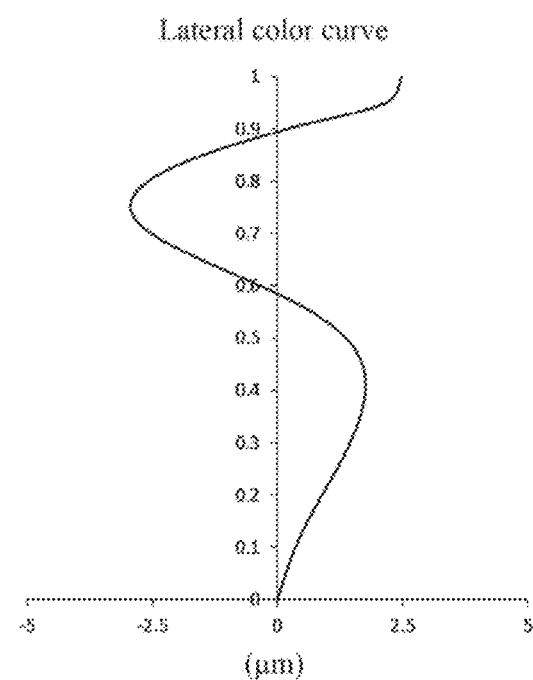

FIG. 12A illustrates a longitudinal aberration curve of the optical imaging lens assembly in Embodiment 6, representing deviations of focal points converged by light of different wavelengths which passes through the lens assembly. FIG. 12B illustrates an astigmatic curve of the optical imaging lens assembly in Embodiment 6, representing a curvature of a tangential image plane and a curvature of a sagittal image plane. FIG. 12C illustrates a distortion curve of the optical imaging lens assembly in Embodiment 6, representing amounts of distortion corresponding to different image heights. FIG. 12D illustrates a lateral color curve of the optical imaging lens assembly in Embodiment 6, representing deviations of different image heights on the image plane formed by light passing through the lens assembly. It can be seen from FIGS. 12A-12D that the optical imaging lens assembly given in Embodiment 6 can achieve a good imaging quality.

In addition, in Embodiments 1-6, the effective focal length f of the optical imaging lens assembly, the focal length values f1-f6 of the lenses, the distance TTL from the object-side surface of the first lens of the optical imaging lens assembly to the image plane of the optical imaging lens assembly along the optical axis, the half of the diagonal length ImgH of the effective pixel area on the image plane of the optical imaging lens assembly, the edge thickness ET4 of the fourth lens and the axial distance SAG61 from the intersection point of the object-side surface of the sixth lens and the optical axis to the vertex of the effective radius of the object-side surface of the sixth lens are as shown in Table 13.

TABLE 13

| parameter | embodiment | | | | | |
| | 1 | 2 | 3 | 4 | 5 | 6 |
|---|---|---|---|---|---|---|
| f (mm) | 3.35 | 3.38 | 3.34 | 3.37 | 3.47 | 3.48 |
| f1 (mm) | 2.79 | 2.44 | 2.80 | 2.86 | 2.51 | 2.76 |
| f2 (mm) | −8.07 | −5.07 | −8.09 | −8.43 | −5.10 | −8.57 |
| f3 (mm) | 34.85 | 100.39 | 21.71 | 171.83 | 42.52 | 90.16 |
| f4 (mm) | −14.91 | −14.25 | −12.79 | −10.69 | −16.30 | −23.57 |
| f5 (mm) | 3.29 | 3.09 | 3.37 | 3.41 | 3.36 | 3.53 |
| f6 (mm) | −2.29 | −2.27 | −2.32 | −2.84 | −2.34 | −2.37 |
| TTL (mm) | 3.85 | 3.96 | 3.86 | 3.84 | 4.01 | 3.92 |

TABLE 13-continued

| parameter | embodiment | | | | | |
|---|---|---|---|---|---|---|
| | 1 | 2 | 3 | 4 | 5 | 6 |
| ImgH (mm) | 3.00 | 3.00 | 3.00 | 3.00 | 3.00 | 3.00 |
| ET4 (mm) | 0.23 | 0.22 | 0.23 | 0.20 | 0.22 | 0.20 |
| SAG61 (mm) | −0.50 | −0.59 | −0.46 | −0.44 | −0.58 | −0.55 |

Conditional expressions in Embodiments 1-6 satisfy the conditions shown in Table 14.

TABLE 14

| conditional expression | embodiment | | | | | |
|---|---|---|---|---|---|---|
| | 1 | 2 | 3 | 4 | 5 | 6 |
| FOV(°) | 82.0 | 81.2 | 82.3 | 81.3 | 79.4 | 79.6 |
| TTL/ImgH | 1.28 | 1.32 | 1.28 | 1.28 | 1.34 | 1.31 |
| f4/f1 | −5.34 | −5.84 | −4.57 | −3.74 | −6.49 | −8.54 |
| f/EPD | 1.91 | 1.91 | 1.91 | 1.91 | 1.91 | 1.91 |
| f4/f | −4.45 | −4.21 | −3.82 | −3.17 | −4.69 | −6.77 |
| f2/f1 | −2.89 | −2.08 | −2.89 | −2.95 | −2.03 | −3.11 |
| f2/f6 | 3.52 | 2.23 | 3.49 | 2.97 | 2.17 | 3.62 |
| 1/ET6/ET4 | 13.72 | 13.86 | 13.15 | 24.69 | 11.69 | 24.63 |
| CT4/SAG41 | −1.20 | −1.28 | −1.14 | −1.31 | −1.71 | −1.07 |
| SAG61/CT6 | −1.51 | −1.78 | −1.39 | −1.33 | −1.74 | −1.66 |
| DT52/DT51 | 1.12 | 1.23 | 1.15 | 1.16 | 1.08 | 0.95 |
| SAG61/SAG51 | 1.77 | 2.29 | 1.60 | 2.77 | 2.33 | 1.16 |
| R7/R8 | 3.08 | 2.69 | 2.74 | 2.18 | 1.41 | 1.58 |
| (R11 + R12)/f6 | 1.26 | 1.02 | 1.29 | 1.47 | 1.09 | 1.20 |
| CT3/ET3 | 1.22 | 1.09 | 1.21 | 1.16 | 1.16 | 1.09 |

The present disclosure further provides an imaging apparatus provided with an electronic photosensitive element for forming an image, and the electronic photosensitive element may be a charge coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the scope of protection of the present disclosure is not limited to the technical solution formed by the particular combinations of the above technical features. The scope of protection should also cover other technical solutions formed by any combination of the above technical features or equivalent features thereof without departing from the concept of the present disclosure, such as, technical solutions formed by replacing the features as disclosed in the present disclosure with (but not limited to) technical features with similar functions.

What is claimed is:

1. An optical imaging lens assembly, comprising, sequentially along an optical axis from an object side to an image side:
   a stop;
   a first lens, having a refractive power;
   a second lens, having a refractive power, an object-side surface of the second lens being a concave surface;
   a third lens, having a positive refractive power;
   a fourth lens, having a negative refractive power, an object-side surface of the fourth lens being a convex surface;
   a fifth lens, having a refractive power; and
   a sixth lens, having a refractive power,
   wherein the optical imaging lens assembly satisfies:

$TTL/ImgH < 1.5;$ $1.0 < R7/R8 < 3.5;$ $-3.5 < f2/f1 < -2.0;$ and $-9.0 < f4/f1 < -3.5,$ wherein TTL is a distance from an object-side surface of the first lens to an image plane of the optical imaging lens assembly along the optical axis, ImgH is half of a diagonal length of an effective pixel area on the image plane of the optical imaging lens assembly, R7 is a radius of curvature of the object-side surface of the fourth lens, R8 is a radius of curvature of an image-side surface of the fourth lens, f2 is an effective focal length of the second lens, f4 is an effective focal length of the fourth lens, and f1 is an effective focal length of the first lens.

2. The optical imaging lens assembly according to claim 1, wherein a maximum field-of-view FOV of the optical imaging lens assembly satisfies:

$FOV \geq 75°.$

3. The optical imaging lens assembly according to claim 2, wherein an effective focal length f of the optical imaging lens assembly and an entrance pupil diameter EPD of the optical imaging lens assembly satisfy:

$f/EPD < 2.0.$

4. The optical imaging lens assembly according to claim 1, wherein the effective focal length f4 of the fourth lens and the effective focal length f of the optical imaging lens assembly satisfy:

$-7.5 < f4/f < -3.0.$

5. The optical imaging lens assembly according to claim 1, wherein an effective focal length f2 of the second lens and an effective focal length f6 of the sixth lens satisfy:

$2.0 < f2/f6 < 4.0.$

6. The optical imaging lens assembly according to claim 1, wherein an edge thickness ET6 of the sixth lens and an edge thickness ET4 of the fourth lens satisfy:

$6.5 < 1/ET6/ET4 < 25.$

7. The optical imaging lens assembly according to claim 1, wherein a center thickness CT4 of the fourth lens on the optical axis and an axial distance SAG41 from an intersection point of the object-side surface of the fourth lens and the optical axis to a vertex of an effective radius of the object-side surface of the fourth lens satisfy:

$-2.0 < CT4/SAG41 < -1.0.$

8. The optical imaging lens assembly according to claim 1, wherein an axial distance SAG61 from an intersection point of an object-side surface of the sixth lens and the optical axis to a vertex of an effective radius of the object-side surface of the sixth lens and a center thickness CT6 of the sixth lens on the optical axis satisfy:

$-2.5 < SAG61/CT6 < -1.0.$

9. The optical imaging lens assembly according to claim 1, wherein a maximum effective radius DT52 of an image-side surface of the fifth lens and a maximum effective radius DT51 of an object-side surface of the fifth lens satisfy:

$0.5 < DT52/DT51 < 1.5.$

10. The optical imaging lens assembly according to claim 1, wherein an axial distance SAG61 from an intersection point of an object-side surface of the sixth lens and the optical axis to a vertex of an effective radius of the object-side surface of the sixth lens and an axial distance SAG51 from an intersection point of an object-side surface of the fifth lens and the optical axis to a vertex of an effective radius of the object-side surface of the fifth lens satisfy:

1.0<SAG61/SAG51<3.5.

11. The optical imaging lens assembly according to claim 1, wherein a radius of curvature R11 of an object-side surface of the sixth lens, a radius of curvature R12 of an image-side surface of the sixth lens and an effective focal length f6 of the sixth lens satisfy:

1.0<(R11+R12)/f6<1.5.

12. The optical imaging lens assembly according to claim 1, wherein a center thickness CT3 of the third lens on the optical axis and an edge thickness ET3 of the third lens satisfy:

1.0<CT3/ET3<2.0.

13. An optical imaging lens assembly, comprising, sequentially along an optical axis from an object side to an image side:
a stop;
a first lens, having a positive refractive power;
a second lens, having a negative refractive power, an object-side surface of the second lens being a concave surface;
a third lens, having a positive refractive power;
a fourth lens, having a negative refractive power, an object-side surface of the fourth lens being a convex surface;
a fifth lens, having a positive refractive power; and
a sixth lens, having a negative refractive power,
wherein a number of lenses having refractive powers in the optical imaging lens assembly is six, and the optical imaging lens assembly satisfies:

FOV≥75°;

−3.5<f2/f1<−2.0;

1.0<R7/R8<3.5; and

−9.0<f4/f1<−3.5, wherein FOV is a maximum field-of-view of the optical imaging lens assembly, f2 is an effective focal length of the second lens, R7 is a radius of curvature of the object-side surface of the fourth lens, R8 is a radius of curvature of an image-side surface of the fourth lens, f4 is an effective focal length of the fourth lens, and f1 is an effective focal length of the first lens.

14. The optical imaging lens assembly according to claim 13, wherein the effective focal length f4 of the fourth lens and an effective focal length f of the optical imaging lens assembly satisfy:

−7.5<f4/f<−3.0.

15. The optical imaging lens assembly according to claim 14, wherein a distance TTL from an object-side surface of the first lens to an image plane of the optical imaging lens assembly along the optical axis and half of a diagonal length ImgH of an effective pixel area on the image plane of the optical imaging lens assembly satisfy:

TTL/ImgH<1.5.

16. The optical imaging lens assembly according to claim 14, wherein the effective focal length f of the optical imaging lens assembly and an entrance pupil diameter EPD of the optical imaging lens assembly satisfy:

f/EPD<2.0.

17. The optical imaging lens assembly according to claim 13, wherein an effective focal length f2 of the second lens and an effective focal length f6 of the sixth lens satisfy:

2.0<f2/f6<4.0.

* * * * *